(12) United States Patent
Sasaki et al.

(10) Patent No.: US 9,502,053 B1
(45) Date of Patent: Nov. 22, 2016

(54) MAGNETIC HEAD FOR PERPENDICULAR MAGNETIC RECORDING WITH A TRAILING SHIELD INCLUDING A PLURALITY OF PORTIONS DIFFERENT IN SATURATION FLUX DENSITY

(71) Applicants: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Yukinori Ikegawa, Milpitas, CA (US); Kazumasa Yasuda, Sunnyvale, CA (US)

(72) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Yukinori Ikegawa, Milpitas, CA (US); Kazumasa Yasuda, Sunnyvale, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 14/981,213

(22) Filed: Dec. 28, 2015

(51) Int. Cl.
  *G11B 5/31* (2006.01)
  *G11B 5/11* (2006.01)
  *G11B 5/127* (2006.01)
  *G11B 5/39* (2006.01)

(52) U.S. Cl.
  CPC ............ *G11B 5/1278* (2013.01); *G11B 5/11* (2013.01); *G11B 5/112* (2013.01); *G11B 5/315* (2013.01); *G11B 5/3116* (2013.01); *G11B 5/3146* (2013.01); *G11B 5/3163* (2013.01); *G11B 5/3967* (2013.01); *Y10T 29/49044* (2015.01); *Y10T 29/49046* (2015.01); *Y10T 29/49048* (2015.01); *Y10T 29/49052* (2015.01)

(58) Field of Classification Search
  None
  See application file for complete search history.

(56) References Cited

U.S. PATENT DOCUMENTS

| 8,472,139 B2 | 6/2013 | Urakami et al. | |
|---|---|---|---|
| 9,299,367 B1 * | 3/2016 | Tang et al. | G11B 5/1278 |
| 9,361,912 B1 * | 6/2016 | Liu et al. | G11B 5/1278 |
| 9,406,317 B1 * | 8/2016 | Tang et al. | G11B 5/1278 |
| 2006/0092564 A1 * | 5/2006 | Le | G11B 5/1278 360/125.3 |
| 2010/0321825 A1 * | 12/2010 | Nazarov | G11B 5/1278 360/125.02 |
| 2013/0078483 A1 * | 3/2013 | Chen et al. | G11B 5/315 216/22 |

* cited by examiner

*Primary Examiner* — Craig A. Renner
(74) *Attorney, Agent, or Firm* — Oliff PLC

(57) ABSTRACT

A magnetic head includes a main pole, a write shield, and a gap section. The write shield includes a trailing shield. The trailing shield includes a first portion, a second portion, a third portion and a fourth portion. The second portion and the third portion are located on opposite sides of the first portion in the track width direction. Top surfaces of the first to third portions are coplanar with each other. The fourth portion lies on the top surfaces of the first to third portions. The first portion is higher in saturation flux density than the second to fourth portions.

17 Claims, 28 Drawing Sheets

MAGNETIC HEAD FOR PERPENDICULAR MAGNETIC RECORDING WITH A TRAILING SHIELD INCLUDING A PLURALITY OF PORTIONS DIFFERENT IN SATURATION FLUX DENSITY

BACKGROUND OF THE INVENTION

1. Field of the Invention

The present invention relates to a magnetic head for perpendicular magnetic recording for use to write data on a recording medium by means of a perpendicular magnetic recording system.

2. Description of the Related Art

The recording systems of magnetic read/write apparatuses include a longitudinal magnetic recording system in which the magnetization of signals is directed along the plane of a recording medium (the longitudinal direction), and a perpendicular magnetic recording system in which the magnetization of signals is directed perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on a substrate. The write head unit includes a coil and a main pole. The main pole has an end face located in a medium facing surface facing a recording medium. The coil produces a magnetic field corresponding to data to be written on the recording medium. The main pole passes a magnetic flux corresponding to the magnetic field produced by the coil, and produces a write magnetic field from its end face.

A magnetic head for use in a magnetic disk drive such as a hard disk drive is typically provided in a slider. The slider has the medium facing surface. The medium facing surface has an air inflow end (a leading end) and an air outflow end (a trailing end). An airflow that comes from the air inflow end into the space between the medium facing surface and the recording medium causes the slider to slightly fly over the surface of the recording medium.

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs depending on the position of the magnetic head across the tracks.

Particularly, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing. In the present application, this phenomenon will be called unwanted erasure. The unwanted erasure includes adjacent track erasure (ATE) and wide-area track erasure (WATE). To achieve higher recording densities, it is necessary to prevent the occurrence of unwanted erasure.

A known technique for preventing unwanted erasure induced by a skew is to provide a wrap-around shield and a gap section, as disclosed in U.S. Pat. No. 8,472,139 B2, for example. The wrap-around shield is a write shield having an end face that is located in the medium facing surface and surrounds the end face of the main pole. The gap section separates the wrap-around shield from the main pole.

The wrap-around shield includes a leading shield, first and second side shields, and a trailing shield. The leading shield has an end face located in the medium facing surface at a position on the leading side of the end face of the main pole. The first and second side shields have two end faces located in the medium facing surface at positions on opposite sides of the end face of the main pole in the track width direction. The trailing shield has an end face located in the medium facing surface at a position on the trailing side of the end face of the main pole.

The gap section includes a leading gap section for separating the leading shield from the main pole, first and second side gap sections for separating the first and second side shields from the main pole, and a trailing gap section for separating the trailing shield from the main pole.

The wrap-around shield has the function of capturing a magnetic flux that is produced from the end face of the main pole and spreads in directions other than the direction perpendicular to the plane of the recording medium, and thereby preventing the magnetic flux from reaching the recording medium. A magnetic head provided with the wrap-around shield is able to prevent unwanted erasure and provide further enhanced recording density.

The position of an end of a record bit to be recorded on the recording medium is determined by the position of the trailing-side edge (hereinafter referred to as the top edge) of the end face of the main pole in the medium facing surface. Accordingly, what are important for improving the write characteristics of the write head unit include: high write magnetic field strength at the top edge or in the vicinity thereof; and a large gradient of change in the write magnetic field strength at the top edge or in the vicinity thereof in the distribution of the write magnetic field strength in the direction in which the tracks extend.

As a structure of a trailing shield that can improve the write characteristics of the write head unit, U.S. Pat. No. 8,472,139 B2 discloses the following structure. The trailing shield includes a first portion located near the top edge of the main pole, and a second portion covering the first portion. The first portion is higher in saturation flux density than the second portion.

The trailing shield including the aforementioned first and second portions is formed by the following method, for example. First, a gap layer is formed on the main pole. Then, a magnetic layer made of a high saturation flux density material is formed on the gap layer. The magnetic layer is then patterned into the first portion by ion beam etching. This etching process performs over-etching to the leading shield. Then, a seed layer is formed to cover the first portion and the leading shield. The second portion is then formed by plating.

The magnetic head with the trailing shield including the aforementioned first and second portions suffers from the problem of unwanted erasure occurring due to the second portion. The reason therefor would be as follows. The second portion is formed on a non-flat underlayer. This causes the second portion to include a plurality of portions having different crystal growth directions. In such a case, the second portion has a greater number of grain boundaries and defects. In the second portion, magnetization rotation and domain wall displacement cannot smoothly proceed, and leakage magnetic field is thus likely to occur from the second portion toward the outside of the medium facing surface. This results in the problem of the occurrence of unwanted erasure.

OBJECT AND SUMMARY OF THE INVENTION

It is an object of the present invention to provide a magnetic head for perpendicular magnetic recording and its manufacturing method that can achieve improved write characteristics and prevent the occurrence of unwanted erasure.

A magnetic head for perpendicular magnetic recording of the present invention includes: a medium facing surface configured to face a recording medium; a coil for producing a magnetic field corresponding to data to be written on the recording medium; a main pole; a write shield; and a gap section formed of a nonmagnetic material. The main pole has an end face located in the medium facing surface. The main pole is configured to pass a magnetic flux corresponding to the magnetic field produced by the coil, and to produce a write magnetic field for use to write data on the recording medium by means of a perpendicular magnetic recording system. The gap section is located between the main pole and the write shield.

The write shield includes a trailing shield located on the front side in the direction of travel of the recording medium relative to the main pole. The trailing shield includes a first portion, a second portion, a third portion and a fourth portion each of which is formed of a magnetic material. The first portion has a first end face located in the medium facing surface, and a first top surface located at a front-side end of the first portion in the direction of travel of the recording medium, the first end face being on the front side in the direction of travel of the recording medium relative to the end face of the main pole. The second portion has a second end face located in the medium facing surface, and a second top surface located at a front-side end of the second portion in the direction of travel of the recording medium. The third portion has a third end face located in the medium facing surface, and a third top surface located at a front-side end of the third portion in the direction of travel of the recording medium.

The second end face and the third end face are located on opposite sides of the first end face in the track width direction. The first to third top surfaces are coplanar with each other. The fourth portion lies on the first to third top surfaces and has a fourth end face located in the medium facing surface. The first portion is higher in saturation flux density than the second to fourth portions.

In the magnetic head of the present invention, the fourth portion may include a seed layer lying on the first to third top surfaces, and a magnetic layer lying on the seed layer. In this case, the trailing shield may further include a fifth portion formed of a magnetic material, and an intermediate film interposed between the magnetic layer and the fifth portion. The fifth portion may be located farther from the medium facing surface than is the magnetic layer. A thickness of the intermediate film in a direction perpendicular to the medium facing surface may be smaller than a maximum thickness of the magnetic layer in the direction perpendicular to the medium facing surface.

In the magnetic head of the present invention, the write shield may further include a first side shield and a second side shield located on opposite sides of the main pole in the track width direction. In this case, the gap section may include a side gap section for separating the first and second side shields from the main pole, and a trailing gap section for separating the trailing shield from the main pole. The first side shield may have a top surface located at a front-side end of the first side shield in the direction of travel of the recording medium. The second side shield may have a top surface located at a front-side end of the second side shield in the direction of travel of the recording medium. In this case, the top surface of the first side shield and the top surface of the second side shield may be coplanar with each other. The first portion of the trailing shield may be located on the trailing gap section. The second portion of the trailing shield may be located on the top surface of the first side shield. The third portion of the trailing shield may be located on the top surface of the second side shield.

In the magnetic head of the present invention, the write shield may include a leading shield in addition to the first and second side shields, the leading shield being located on the rear side in the direction of travel of the recording medium relative to the main pole.

In the magnetic head of the present invention, the gap section may include a trailing gap section for separating an end face located in the medium facing surface. The medium facing surface may include a boundary between the end face of the trailing gap section and the first end face. At the boundary, locations of opposite ends of the first end face in the track width direction may coincide with locations of opposite ends of the end face of the trailing gap section in the track width direction.

The magnetic head of the present invention may further include a first nonmagnetic layer formed of a nonmagnetic material and located on the front side in the direction of travel of the recording medium relative to the main pole, the first nonmagnetic layer being at a greater the trailing shield from the main pole. In this case, the trailing gap section may have distance from the medium facing surface than is the first portion. In this case, the first nonmagnetic layer may have a top surface located at a front-side end of the first nonmagnetic layer in the direction of travel of the recording medium. The top surface of the first nonmagnetic layer may be coplanar with the first to third top surfaces.

When the magnetic head of the present invention includes the first nonmagnetic layer, the magnetic head may further include a second nonmagnetic layer formed of a nonmagnetic material and located on the front side in the direction of travel of the recording medium relative to the main pole, the second nonmagnetic layer being at a greater distance from the medium facing surface than is the first portion. In this case, at least part of the second nonmagnetic layer may be located between the first portion and the first nonmagnetic layer. The second nonmagnetic layer may have a top surface located at a front-side end of the second nonmagnetic layer in the direction of travel of the recording medium. The top surface of the second nonmagnetic layer may be coplanar with the first to third top surfaces and the top surface of the first nonmagnetic layer.

A manufacturing method for the magnetic head of the present invention includes the steps of: forming the coil; forming the main pole; forming the write shield; and forming the gap section. The step of forming the write shield includes the step of forming the trailing shield.

The step of forming the trailing shield includes the steps of: forming a first magnetic film and a second magnetic film, the first magnetic film including the second portion and the third portion, the second magnetic film including the first portion; polishing the first and second magnetic films so that the first to third top surfaces are formed; and forming a third magnetic film on the first and second magnetic films polished, the third magnetic film including the fourth portion.

In the manufacturing method for the magnetic head of the present invention, the step of forming the first magnetic film and the second magnetic film may form the second magnetic film after forming the first magnetic film.

In the manufacturing method for the magnetic head of the present invention, the step of forming the third magnetic film may include the steps of: forming a seed layer on the first and second magnetic films; and forming a magnetic layer on the seed layer by plating using the seed layer as a seed and a cathode. In this case, the trailing shield may further include a fifth portion formed of a magnetic material, and an intermediate film interposed between the magnetic layer and the fifth portion. The fifth portion may be located farther from the medium facing surface than is the magnetic layer. A thickness of the intermediate film in a direction perpendicular to the medium facing surface may be smaller than a maximum thickness of the magnetic layer in the direction perpendicular to the medium facing surface. The step of forming the trailing shield may further include the steps of: forming the intermediate film after the step of forming the magnetic layer; and forming the fifth portion after the step of forming the intermediate film.

In the manufacturing method for the magnetic head of the present invention, the write shield may further include a first side shield and a second side shield located on opposite sides of the main pole in the track width direction. In this case, the gap section may include a side gap section for separating the first and second side shields from the main pole, and a trailing gap section for separating the trailing shield from the main pole. The first side shield may have a top surface located at a front-side end of the first side shield in the direction of travel of the recording medium. The second side shield may have a top surface located at a front-side end of the second side shield in the direction of travel of the recording medium. In this case, the top surface of the first side shield and the top surface of the second side shield may be coplanar with each other. The first portion of the trailing shield may be located on the trailing gap section. The second portion of the trailing shield may be located on the top surface of the first side shield. The third portion of the trailing shield may be located on the top surface of the second side shield.

When the trailing shield includes the first and second side shields, the step of forming the write shield may further include the step of forming the first and second side shields before the step of forming the trailing shield. The step of forming the gap section may include the step of forming the trailing gap section after the step of forming the first and second side shields and the step of forming the main pole and before the step of forming the trailing shield.

The step of forming the first magnetic film and the second magnetic film may form the first magnetic film by plating using the first and second side shields as a seed and a cathode, and then form the second magnetic film.

In the manufacturing method for the magnetic head of the present invention, the gap section may include a trailing gap section for separating the trailing shield from the main pole. In this case, the trailing gap section may have an end face located in the medium facing surface. The medium facing surface may include a boundary between the end face of the trailing gap section and the first end face. At the boundary, locations of opposite ends of the first end face in the track width direction may coincide with locations of opposite ends of the end face of the trailing gap section in the track width direction. In this case, the step of forming the gap section may include the step of forming the trailing gap section. The step of forming the trailing gap section may include the steps of forming a nonmagnetic film including the trailing gap section; forming a mask on the nonmagnetic film; and etching a part of the nonmagnetic film using the mask so that the trailing gap section is formed. In this case, the step of forming the first magnetic film and the second magnetic film may form the first magnetic film in the presence of the mask, then remove the mask, and then form the second magnetic film.

The magnetic head manufactured by the manufacturing method of the present invention may further include a first nonmagnetic layer formed of a nonmagnetic material and located on the front side in the direction of travel of the recording medium relative to the main pole, the first nonmagnetic layer being at a greater distance from the medium facing surface than is the first portion. In this case, the first nonmagnetic layer may have a top surface located at a front-side end of the first nonmagnetic layer in the direction of travel of the recording medium. The top surface of the first nonmagnetic layer may be coplanar with the first to third top surfaces. In this case, the manufacturing method for the magnetic head of the present invention may further include the step of forming the first nonmagnetic layer before the first and second magnetic films are formed. In this case, the step of polishing the first and second magnetic films may polish the first and second magnetic films using the first nonmagnetic layer as a polishing stopper. The step of polishing the first and second magnetic films may define the length of the first portion in the direction perpendicular to the medium facing surface.

When the magnetic head manufactured by the manufacturing method of the present invention includes the first nonmagnetic layer, the magnetic head may further include a second nonmagnetic layer formed of a nonmagnetic material and located on the front side in the direction of travel of the recording medium relative to the main pole, the second nonmagnetic layer being at a greater distance from the medium facing surface than is the first portion. In this case, at least part of the second nonmagnetic layer may be located between the first portion and the first nonmagnetic layer. The second nonmagnetic layer may have a top surface located at a front-side end of the second nonmagnetic layer in the direction of travel of the recording medium. The top surface of the second nonmagnetic layer may be coplanar with the first to third top surfaces and the top surface of the first nonmagnetic layer. In this case, the manufacturing method for the magnetic head of the present invention may further include the step of forming an initial nonmagnetic layer to cover the first nonmagnetic layer after the first nonmagnetic layer is formed and before the first and second magnetic films are formed. In this case, the step of polishing the first and second magnetic films may polish the initial nonmagnetic layer together with the first and second magnetic films so that the initial nonmagnetic layer becomes the second nonmagnetic layer.

In the magnetic head of the present invention, the trailing shield includes the first portion which is higher in saturation flux density than the second to fourth portions. This makes it possible to provide improved write characteristics. Further, in the present invention, the first to third top surfaces are coplanar with each other, and the fourth portion lies on the first to third top surfaces. This allows the fourth portion to be formed such that the entirety or most part of the fourth portion has a uniform crystal growth direction. As a result, it is possible to prevent the occurrence of unwanted erasure attributable to the fourth portion.

Other objects, features and advantages of the present invention will become fully apparent from the following description.

DETAILED DESCRIPTION OF THE PREFERRED EMBODIMENTS

First Embodiment

Figure 3:
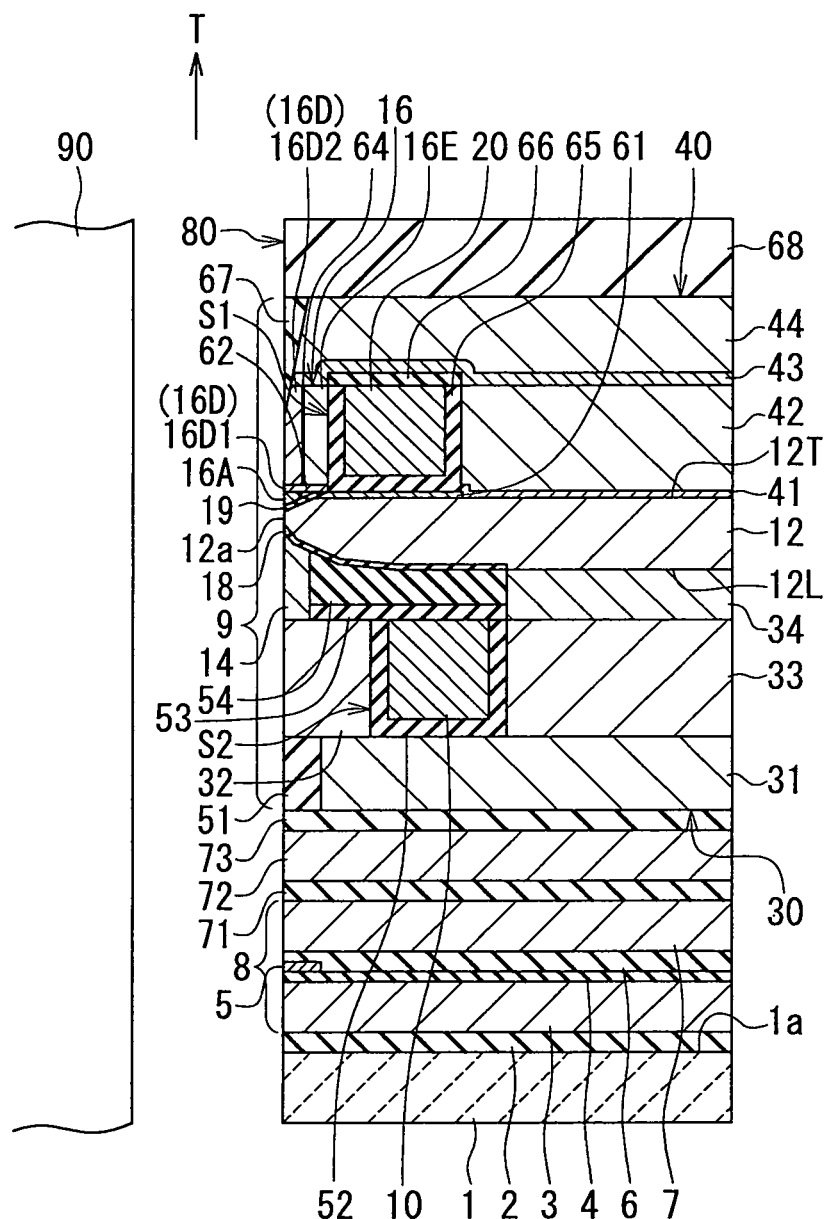
FIG. 3 is a cross-sectional view of the magnetic head according to the first embodiment of the invention.
Figure 4:
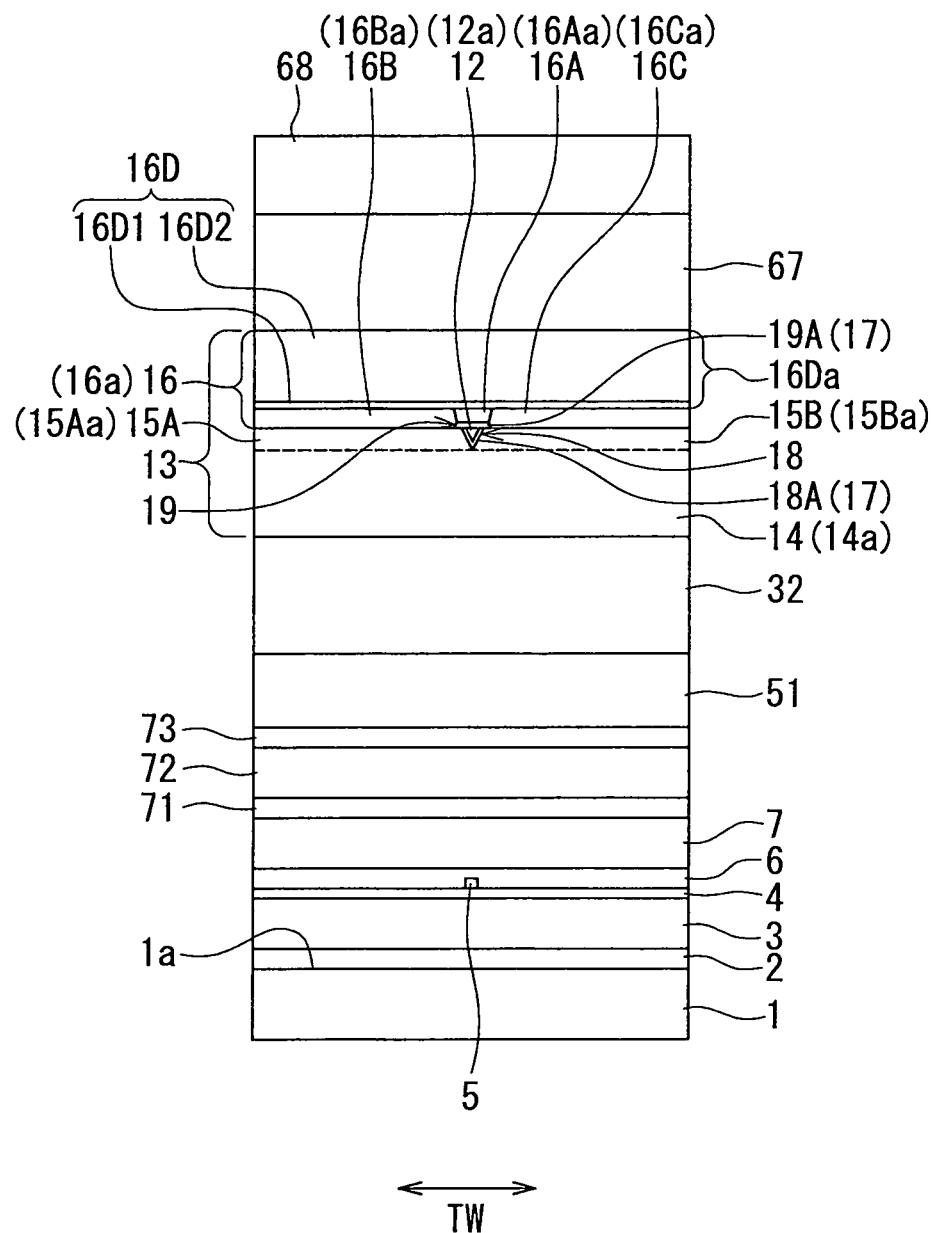
FIG. 4 is a front view showing the medium facing surface of the magnetic head according to the first embodiment of the invention.
Figure 5:
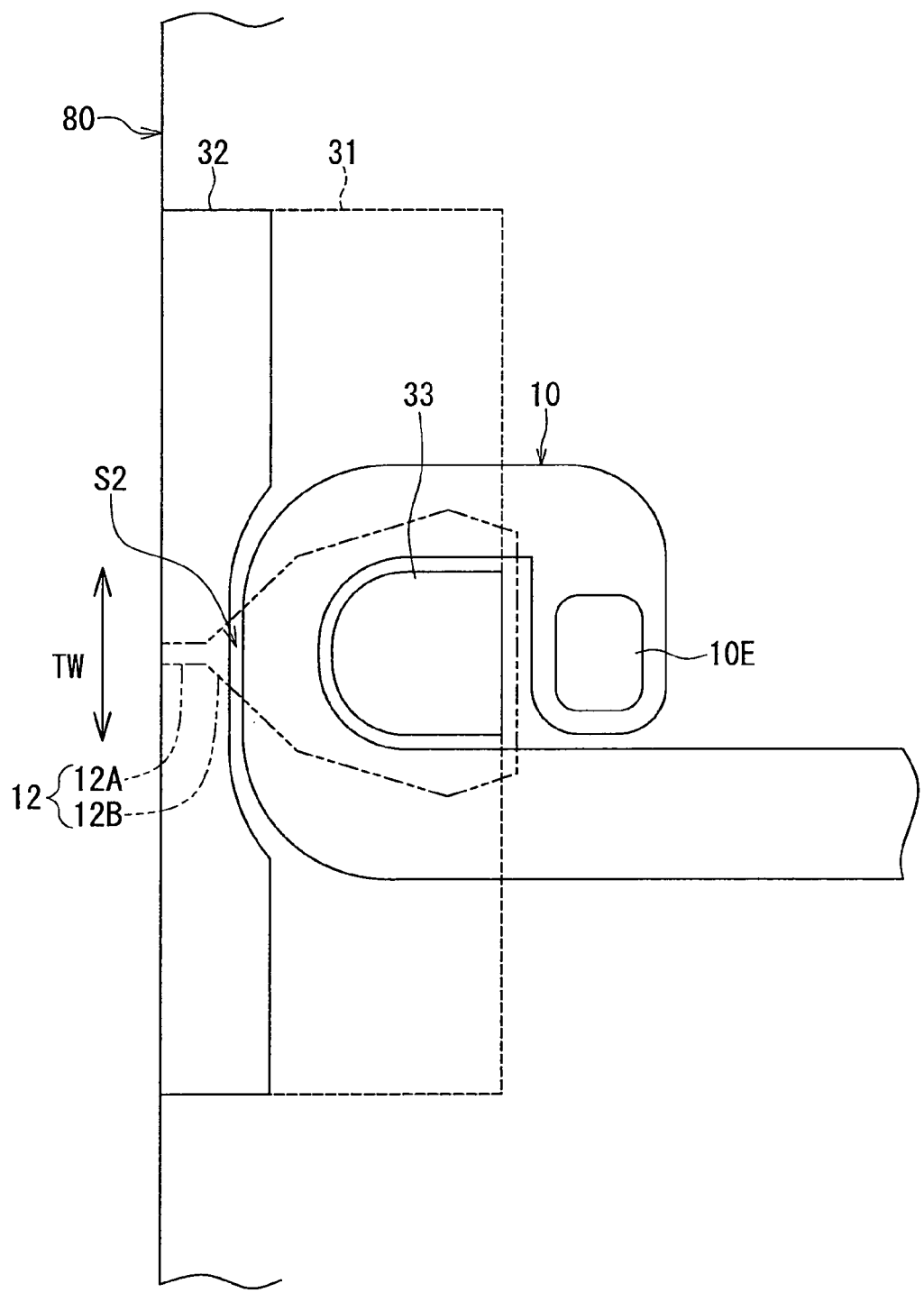
FIG. 5 is a plan view showing a second coil portion of the magnetic head according to the first embodiment of the invention.
Figure 6:
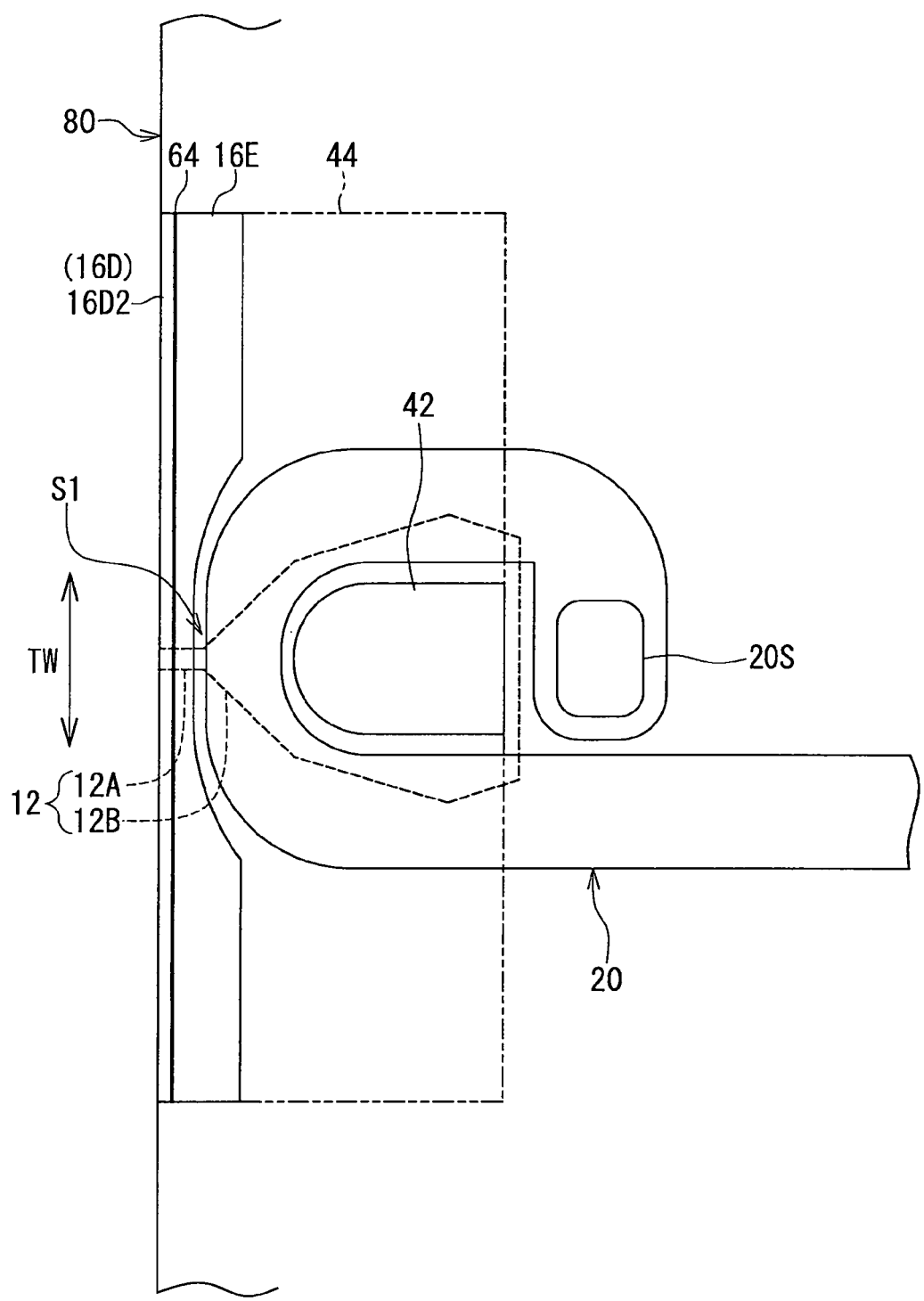
FIG. 6 is a plan view showing a first coil portion of the magnetic head according to the first embodiment of the invention.

Preferred embodiments of the present invention will now be described in detail with reference to the drawings. First, reference is made to FIG. 3 to FIG. 6 to describe the configuration of a magnetic head for perpendicular magnetic recording (hereinafter simply referred to as magnetic head) according to a first embodiment of the invention. FIG. 3 is a cross-sectional view of the magnetic head according to the present embodiment. The arrow labeled T in FIG. 3 indicates the direction of travel of a recording medium. FIG. 4 is a front view showing the medium facing surface of the magnetic head according to the present embodiment. FIG. 5 is a plan view showing a second coil portion of the magnetic head according to the present embodiment. FIG. 6 is a plan view showing a first coil portion of the magnetic head according to the present embodiment. In FIG. 4 to FIG. 6, the arrow labeled TW indicates the track width direction.

The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

Here, the side of the positions closer to the leading end relative to a reference position will be referred to as the leading side, and the side of the positions closer to the trailing end relative to the reference position will be referred to as the trailing side. The leading side is the rear side in the direction T of travel of the recording medium 90 relative to the slider. The trailing side is the front side in the direction T of travel of the recording medium 90 relative to the slider.

As shown in FIG. 3, the magnetic head has the medium facing surface 80 mentioned above. As shown in FIG. 3 and FIG. 4, the magnetic head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and disposed on the second read shield layer 7; a middle shield layer 72 formed of a magnetic material and disposed on the nonmagnetic layer 71; a nonmagnetic layer 73 formed of a nonmagnetic material and disposed on the middle shield layer 72; and a write head unit 9 disposed on the nonmagnetic layer 73. The middle shield layer 72 has the function of shielding the MR element 5 from magnetic fields generated at the write head unit 9. The nonmagnetic layers 71 and 73 are formed of alumina, for example.

The write head unit 9 includes a coil, a main pole 12, a write shield 13 and a gap section 17. The coil produces a magnetic field corresponding to data to be written on the recording medium 90. The coil includes a first coil portion 20 and a second coil portion 10. The first coil portion 20 and the second coil portion 10 are both formed of a conductive material such as copper. The first coil portion 20 and the second coil portion 10 are connected in series or in parallel. The main pole 12 has an end face 12a located in the medium facing surface 80. The main pole 12 passes a magnetic flux corresponding to the magnetic field produced by the coil, and produces a write magnetic field for use to write data on the recording medium 90 by means of a perpendicular magnetic recording system. FIG. 3 shows a cross section that intersects the end face 12a of the main pole 12 and that is perpendicular to the medium facing surface 80 and to the top surface 1a of the substrate 1. Such a cross section will hereinafter be referred to as the main cross section.

The write shield 13 includes a trailing shield 16, a first side shield 15A, a second side shield 15B and a leading shield 14. The trailing shield 16 is located on the trailing side, i.e., the front side in the direction T of travel of the recording medium 90, relative to the main pole 12. The leading shield 14 is located on the leading side, i.e., the rear side in the direction T of travel of the recording medium 90, relative to the main pole 12. The first and second side shields 15A and 15B are located on opposite sides of the main pole 12 in the track width direction TW and magnetically couple the leading shield 14 and the trailing shield 16 to each other. The leading shield 14 and the first and second side shields 15A and 15B may be formed of different magnetic layers or a single magnetic layer. FIG. 4 illustrates the latter case. In FIG. 4, the boundary between the leading shield 14 and each of the first and second side shields 15A and 15B is shown by a broken line. Any figures similar to FIG. 4, to be referred to for descriptions below, will also employ the same way of illustration of the aforementioned boundary as in FIG. 4. Materials usable for the write shield 13A will be described in detail later.

The write head unit 9 further includes a first return path section 40 and a second return path section 30. The entirety or most part of each of the first and second return path sections 40 and 30 is formed of a magnetic material. For example, CoFeN, CoNiFe, NiFe or CoFe can be used as the material of each of the first and second return path sections 40 and 30. The first return path section 40 is located on the trailing side, i.e., the front side in the direction T of travel of the recording medium 90, relative to the main pole 12, and connects the write shield 13 to a part of the main pole 12 located away from the medium facing surface 80, thereby magnetically coupling the write shield 13 and the main pole 12 to each other. The second return path section 30 is located on the leading side, i.e., the rear side in the direction T of travel of the recording medium 90, relative to the main pole 12, and connects the write shield 13 to a part of the main pole 12 located away from the medium facing surface 80, thereby magnetically coupling the write shield 13 and the main pole 12 to each other.

The second return path section 30 includes magnetic layers 31, 32, 33 and 34. The magnetic layer 31 lies on the nonmagnetic layer 73. The magnetic layers 32 and 33 both lie on the magnetic layer 31. The magnetic layer 32 is located near the medium facing surface 80. The magnetic layer 33 is located farther from the medium facing surface 80 than is the magnetic layer 32. The magnetic layer 31 has an end face facing toward the medium facing surface 80 and located at a distance from the medium facing surface 80. The magnetic layer 32 has an end face located in the medium facing surface 80.

As shown in FIG. 5, the second coil portion 10 is wound around the magnetic layer 33. The write head unit 9 further includes: an insulating layer 51 formed of an insulating material, lying on the nonmagnetic layer 73 and surrounding the magnetic layer 31; an insulating film 52 formed of an insulating material and separating the second coil portion 10 from the magnetic layers 31 to 33; and a non-illustrated insulating layer formed of an insulating material and disposed around the second coil portion 10 and the magnetic layer 32. The top surfaces of the second coil portion 10, the magnetic layers 32 and 33, the insulating film 52 and the non-illustrated insulating layer are even with each other. The insulating layer 51, the insulating film 52 and the non-illustrated insulating layer are formed of alumina, for example.

The leading shield 14 lies on the magnetic layer 32. The magnetic layer 34 lies on the magnetic layer 33. The write head unit 9 further includes an insulating layer 53 formed of an insulating material, and a nonmagnetic layer 54 formed of a nonmagnetic material. The insulating layer 53 lies over the top surfaces of the second coil portion 10, the insulating film 52 and the non-illustrated insulating layer, and a part of the top surface of the magnetic layer 32. The nonmagnetic layer 54 lies on the insulating layer 53 and surrounds the leading shield 14 and the magnetic layer 34. The insulating layer 53 and the nonmagnetic layer 54 are formed of alumina, for example.

The first and second side shields 15A and 15B are disposed on the leading shield 14. The main pole 12 has: the end face 12a; a top surface 12T (see FIG. 3) located at the trailing-side end of the main pole 12, i.e., the front-side end of the main pole 12 in the direction T of travel of the recording medium 90; a bottom end 12L (see FIG. 3) opposite to the top surface 12T; and a first side part and a second side part (see FIG. 4) opposite to each other in the track width direction TW. The first side shield 15A has a first sidewall opposed to the first side part of the main pole 12. The second side shield 15B has a second sidewall opposed to the second side part of the main pole 12.

The gap section 17 is located between the main pole 12 and the write shield 13. The gap section 17 includes a side gap section for separating the first and second side shields 15A and 15B from the main pole 12, and a trailing gap section for separating the trailing shield 16 from the main pole 12. The write head unit 9 further includes a first gap layer 18 and a second gap layer 19 each formed of a nonmagnetic material. Part of the first gap layer 18 constitutes the side gap section. Part of the second gap layer 19 constitutes the trailing gap section. The side gap section will be denoted by symbol 18A, and the trailing gap section will be denoted by symbol 19A.

The first gap layer 18 is disposed to extend along the first and second sidewalls of the first and second side shields 15A and 15B, the top surface of the leading shield 14 and the top surface of the nonmagnetic layer 54. The nonmagnetic material used to form the first gap layer 18 may be an insulating material or a nonmagnetic metal material. Alumina is an example of an insulating material that can be used to form the first gap layer 18. Ru is an example of a nonmagnetic metal material that can be used to form the first gap layer 18.

A part of the main pole 12 lies above the top surfaces of the leading shield 14 and the nonmagnetic layer 54. The first gap layer 18 is interposed between the part of the main pole 12 and the top surfaces of the leading shield 14 and the nonmagnetic layer 54. As shown in FIG. 4, the first gap layer 18 is interposed also between the first side part of the main pole 12 and the first sidewall of the first side shield 15A, and between the second side part of the main pole 12 and the second sidewall of the second side shield 15B. The side gap section 18A is constituted by a part of the first gap layer 18 that is interposed between the first side part of the main pole 12 and the first sidewall of the first side shield 15A, and a part of the first gap layer 18 that is interposed between the second side part of the main pole 12 and the second sidewall of the second side shield 15B.

The bottom end 12L of the main pole 12 is in contact with the top surface of the magnetic layer 34 at a location away from the medium facing surface 80. The main pole 12 is formed of a magnetic metal material. The material of the main pole 12 may be NiFe, CoNiFe, or CoFe, for example.

The write head unit 9 further includes a nonmagnetic layer 60 formed of a nonmagnetic material and disposed around the main pole 12, the first side shield 15A and the second side shield 15B. The nonmagnetic layer 60 is shown in FIG. 7C and FIG. 8C to be described later. The nonmagnetic layer 60 is formed of alumina, for example.

The write head unit 9 further includes a first nonmagnetic layer 61 formed of a nonmagnetic material and lying on a first portion of the top surface 12T of the main pole 12, the first portion being located away from the medium facing surface 80. The nonmagnetic material used to form the first nonmagnetic layer 61 may be a metal material such as Ru, NiCr, or NiCu.

The second gap layer 19 is disposed to cover a part of the main pole 12 in the vicinity of the medium facing surface 80. The material of the second gap layer 19 may be a nonmagnetic insulating material such as alumina, or a nonmagnetic conductive material such as Ru, NiCu, Ta, W, NiB, or NiP.

The trailing shield 16 lies on the first side shield 15A, the second side shield 15B and the second gap layer 19, and is in contact with the top surfaces of the first side shield 15A, the second side shield 15B and the second gap layer 19. The trailing gap section 19A is constituted by a part of the second gap layer 19 that is interposed between the top surface 12T of the main pole 12 and the bottom surface of the trailing shield 16. The trailing gap section 19A or the second gap layer 19 preferably has a thickness in the range of 5 to 60 nm, such as 30 to 60 nm. The end face 12a of the main pole 12 has a side in contact with the second gap layer 19. This side of the end face 12a defines the track width.

As shown in FIG. 3 and FIG. 4, the trailing shield 16 includes a first portion 16A, a second portion 16B, a third portion 16C and a fourth portion 16D each of which is formed of a magnetic material. As shown in FIG. 4, the first portion 16A is located on the trailing gap section 19A. The second portion 16B and the third portion 16C are located on opposite sides of the first portion 16A in the track width direction TW.

Figure 2:
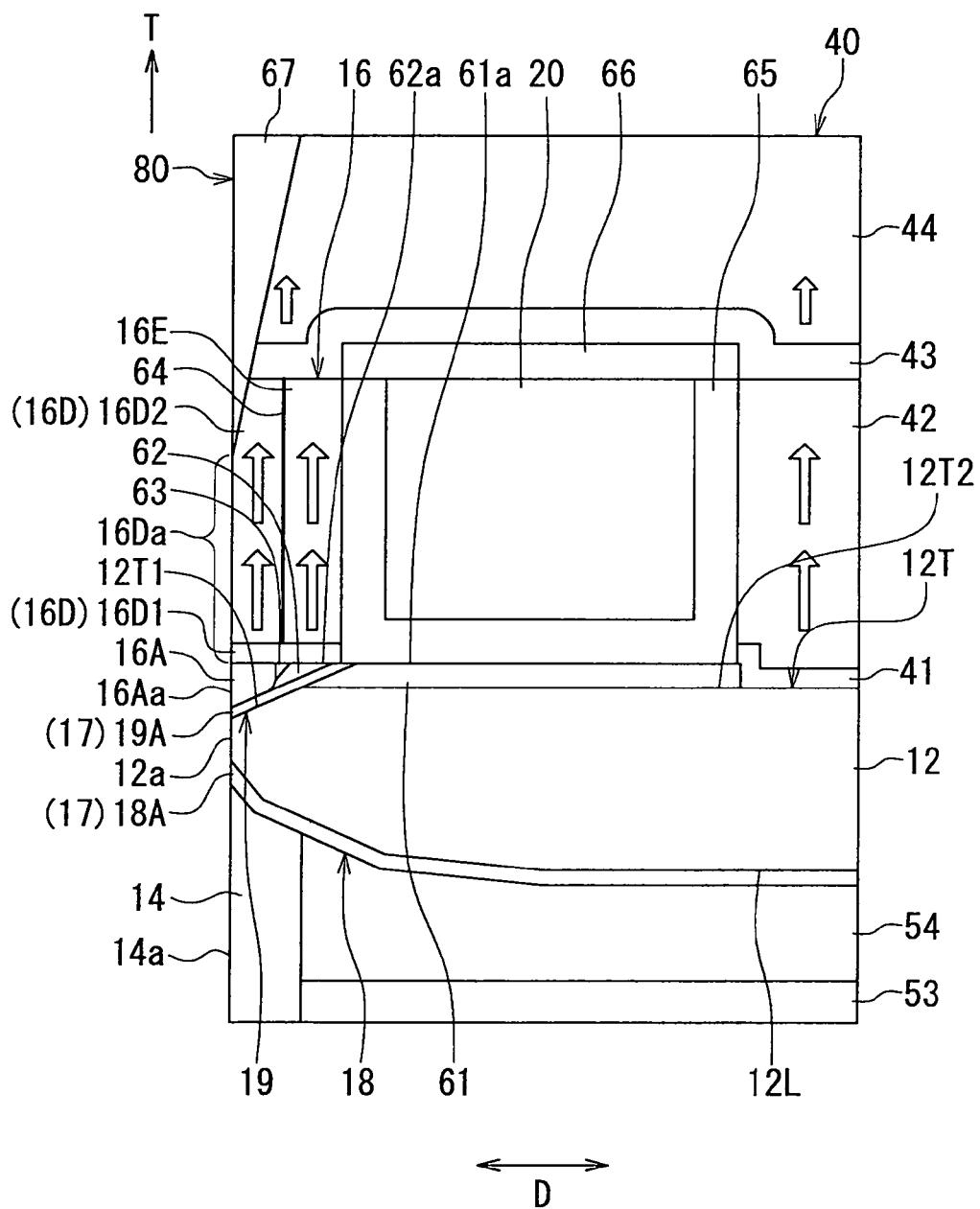
FIG. 2 is a cross-sectional view showing the main part of the magnetic head according to the first embodiment of the invention.

The write head unit 9 further includes a second nonmagnetic layer 62 and a third nonmagnetic layer 63 each formed of a nonmagnetic material. The second nonmagnetic layer 62 is at a distance from the medium facing surface 80 and lies on the second gap layer 19. The third nonmagnetic layer 63 is disposed around the first to third portions 16A, 16B and 16C of the trailing shield 16 and the second nonmagnetic layer 62. The third nonmagnetic layer 63 is shown in FIG. 2 to be described later. The second nonmagnetic layer 62 has a thickness in the range of 100 to 300 nm, for example. The second nonmagnetic layer 62 is formed of alumina or $SiO_2$, for example. The third nonmagnetic layer 63 is formed of alumina, for example.

The fourth portion 16D of the trailing shield 16 includes a seed layer 16D1 and a magnetic layer 16D2. The seed layer 16D1 lies on the first to third portions 16A, 16B and 16C. The magnetic layer 16D2 lies on the seed layer 16D1 in the vicinity of the medium facing surface 80. In the present embodiment, the trailing shield 16 further includes a fifth portion 16E and an intermediate film 64. The fifth portion 16E is formed of a magnetic material and lies on the seed layer 16D1. The intermediate film 64 is interposed between the magnetic layer 16D2 and the fifth portion 16E. The fifth portion 16E is located farther from the medium facing surface 80 than is the magnetic layer 16D2. The seed layer 16D1 is used as a seed and a cathode in forming the magnetic layer 16D2 and the fifth portion 16E by plating.

In FIG. 3 the intermediate film 64 is shown by a thick line. The thickness of the intermediate film 64 in the direction perpendicular to the medium facing surface 80 is smaller than the maximum thickness of the magnetic layer 16D2 in the direction perpendicular to the medium facing surface 80. Materials usable for the intermediate film 64 will be described in detail later.

The first return path section 40 includes seed layers 41 and 43 and magnetic layers 42 and 44. The seed layer 41 lies on a second portion of the top surface 12T of the main pole 12, the second portion being located away from the medium facing surface 80. The second portion of the top surface 12T of the main pole 12 is located farther from the medium facing surface 80 than is the first portion of the top surface 12T of the main pole 12. The magnetic layer 42 lies on the seed layer 41. The seed layer 41 is used as a seed and a cathode in forming the magnetic layer 42 by plating.

As shown in FIG. 6, the first coil portion 20 is wound around the magnetic layer 42. The write head unit 9 further includes: an insulating film 65 formed of an insulating material and separating the first coil portion 20 from the trailing shield 16, the magnetic layer 42 and the first nonmagnetic layer 61; a non-illustrated nonmagnetic layer disposed around the trailing shield 16 and the first coil portion 20; and an insulating layer 66 formed of an insulating material and lying on the top surfaces of the first coil portion 20 and the insulating film 65. The insulating film 65, the insulating layer 66 and the non-illustrated nonmagnetic layer are formed of alumina, for example.

The seed layer 43 lies on the trailing shield 16, the magnetic layer 42 and the insulating layer 66. The magnetic layer 44 lies on the seed layer 43. The seed layer 43 is used as a seed and a cathode in forming the magnetic layer 44 by plating. The seed layer 43 has an end closest to the medium facing surface 80. This end of the seed layer 43 is located at a distance from the medium facing surface 80. The magnetic layer 44 has an end face facing toward the medium facing surface 80 and located at a distance from the medium facing surface 80. The distance from the medium facing surface 80 to any point on the end face of the magnetic layer 44 increases with increasing distance between the point and the top surface 1a of the substrate 1.

The write head unit 9 further includes a nonmagnetic layer 67 formed of a nonmagnetic material and disposed around the seed layer 43 and the magnetic layer 44. The nonmagnetic layer 67 is formed of alumina, for example.

As shown in FIG. 3 and FIG. 4, the magnetic head further includes a protective layer 68 formed of a nonmagnetic material and disposed to cover the write head unit 9. The protective layer 68 is formed of, for example, an inorganic insulating material such as alumina.

As has been described, the magnetic head according to the present embodiment includes the medium facing surface 80, the read head unit 8, and the write head unit 9. The read head unit 8 and the write head unit 9 are stacked on the substrate 1. The write head unit 9 is located on the front side in the direction T of travel of the recording medium 90 relative to the read head unit 8.

The write head unit 9 includes the coil including the first and second coil portions 20 and 10, the main pole 12, the write shield 13, the gap section 17, the first nonmagnetic layer 61, and the second nonmagnetic layer 62. The write shield 13 includes the trailing shield 16, the first side shield 15A, the second side shield 15B and the leading shield 14. The gap section 17 includes the side gap section 18A and the trailing gap section 19A. The side gap section 18A is constituted by part of the first gap layer 18. The trailing gap section 19A is constituted by part of the second gap layer 19. Since the first and second gap layers 18 and 19 are both formed of nonmagnetic material, the gap section 17 is formed of nonmagnetic material.

The first return path section 40 includes the seed layers 41 and 43 and the magnetic layers 42 and 44. The first return path section 40 is located on the trailing side, i.e., the front side in the direction T of travel of the recording medium 90 relative to the main pole 12, and connects the write shield 13 to a part of the main pole 12 located away from the medium facing surface 80 so that a first space S1 is defined by the main pole 12, the gap section 17 (the gap layer 19), the write shield 13 and the first return path section 40. The first coil portion 20 passes through the first space S1.

The second return path section 30 includes the magnetic layers 31 to 34. The second return path section 30 is located on the leading side, i.e., the rear side in the direction T of travel of the recording medium 90 relative to the main pole 12, and connects the write shield 13 to a part of the main pole 12 located away from the medium facing surface 80 so that a second space S2 is defined by the main pole 12, the gap section 17 (the gap layer 18), the write shield 13 and the second return path section 30. The second coil portion 10 passes through the second space S2.

The write shield 13 captures a disturbance magnetic field applied to the magnetic head from the outside thereof. This makes it possible to prevent the disturbance magnetic field from being intensively captured into the main pole 12 and thereby causing erroneous writing on the recording medium 90. The write shield 13 also has the function of capturing a magnetic flux that is produced from the end face 12a of the main pole 12 and spreads in directions other than the direction perpendicular to the plane of the recording medium 90, and thereby preventing the magnetic flux from reaching the recording medium 90. Furthermore, the write shield 13 and the first and second return path sections 40 and 30 have the function of allowing a magnetic flux that has been produced from the end face 12a of the main pole 12 and has magnetized a part of the recording medium 90 to flow back.

The first coil portion 20 and the second coil portion 10 will now be described in detail with reference to FIG. 5 and FIG. 6. As shown in FIG. 5, the second coil portion 10 is wound approximately once around the magnetic layer 33. The second coil portion 10 includes a part extending to pass through the second space S2. The second coil portion 10 has a coil connection 10E electrically connected to the first coil portion 20.

As shown in FIG. 6, the first coil portion 20 is wound approximately once around the magnetic layer 42. The first coil portion 20 includes a part extending to pass through the first space S1. The first coil portion 20 has a coil connection 20S electrically connected to the coil connection 10E of the second coil portion 10. The coil connection 20S is electrically connected to the coil connection 10E via first and second connection layers of columnar shape (not illustrated) that penetrate a plurality of layers interposed between the first coil portion 20 and the second coil portion 10. The first and second connection layers are stacked in this order on the coil connection 10E. The coil connection 20S lies on the second connection layer. The first and second connection layers are each formed of a conductive material such as copper. In the example shown in FIG. 5 and FIG. 6, the first coil portion 20 and the second coil portion 10 are connected in series.

Figure 1:
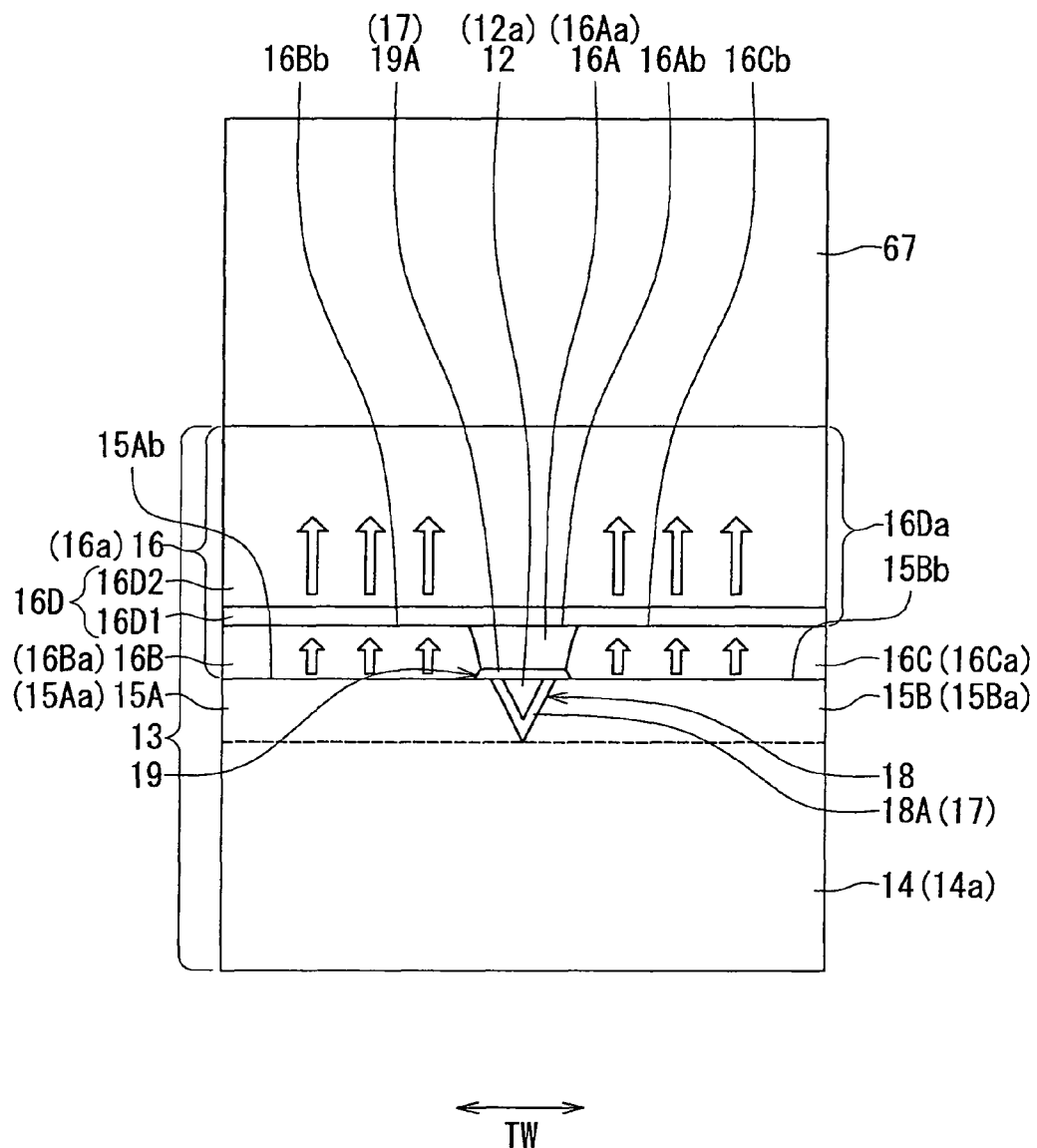
FIG. 1 is a front view showing the main part of a magnetic head according to a first embodiment of the invention.

The shape of the main pole 12 will now be described in detail with reference to FIG. 1, FIG. 2, FIG. 5 and FIG. 6. FIG. 1 is a front view showing the main part of the magnetic head according to the present embodiment. FIG. 2 is a cross-sectional view showing the main part of the magnetic head according to the present embodiment. FIG. 2 shows the main cross section. As shown in FIG. 5 and FIG. 6, the main pole 12 includes a track width defining portion 12A and a wide portion 12B. The track width defining portion 12A has the end face 12a and an end opposite to the end face 12a. The wide portion 12B is connected to the end of the track width defining portion 12A. The main pole 12 has the top surface 12T, the bottom end 12L, the first side part and the second side part. The width of the top surface 12T in the track width direction TW is greater in the wide portion 12B than in the track width defining portion 12A.

In the track width defining portion 12A, the width of the top surface 12T in the track width direction TW is generally constant regardless of distance from the medium facing surface 80. In the wide portion 12B, the width of the top surface 12T in the track width direction TW is, for example, equal to that in the track width defining portion 12A at the boundary between the track width defining portion 12A and the wide portion 12B, and increases with increasing distance from the medium facing surface 80. The length of the track width defining portion 12A in the direction perpendicular to the medium facing surface 80 will be referred to as the neck height. The neck height falls within the range of 0 to 0.3 µm, for example. A zero neck height means that the track width defining portion 12A is not provided and the wide portion 12B thus has the end face 12a.

As shown in FIG. 2, the top surface 12T includes an inclined portion 12T1 and a flat portion 12T2, the inclined portion 12T1 being located closer to the medium facing surface 80 than the flat portion 12T2. The inclined portion 12T1 has a first end located in the medium facing surface 80 and a second end opposite to the first end. The flat portion 12T2 is connected to the second end of the inclined portion 12T1. The inclined portion 12T1 is inclined with respect to the medium facing surface 80 and the direction perpendicular to the medium facing surface 80 such that the second end is located on the front side in the direction T of travel of the recording medium 90 relative to the first end. In FIG. 2, the arrow labeled D indicates the direction perpendicular to the medium facing surface 80. The flat portion 12T2 extends substantially in the direction D perpendicular to the medium facing surface 80.

The bottom end 12L may include an inclined portion opposed to the top surface of the leading shield 14. The inclined portion of the bottom end 12L has a first end located in the medium facing surface 80 and a second end opposite to the first end. The inclined portion of the bottom end 12L may be an edge formed by two intersecting surfaces, or may be a surface connecting two surfaces. The inclined portion of the bottom end 12L is inclined with respect to the medium facing surface 80 and the direction D perpendicular to the medium facing surface 80 such that its second end is located on the rear side in the direction T of travel of the recording medium 90 relative to its first end. The bottom end 12L excluding the inclined portion is a surface connected to the second end of the inclined portion.

As shown in FIG. 1, the end face 12a of the main pole 12 has a first side in contact with the second gap layer 19, a second side connected to one end of the first side, and a third side connected to the other end of the first side. The first side defines the track width. The position of an end of a record bit to be recorded on the recording medium 90 is determined by the position of the first side. The width of the end face 12a of the main pole 12 in the track width direction TW decreases with increasing distance from the first side, that is, with decreasing distance to the top surface 1a of the substrate 1. Each of the second side and the third side forms an angle of, for example, 7° to 17°, or preferably 10° to 15°, with respect to a direction perpendicular to the top surface 1a of the substrate 1. The first side has a length in the range of 0.05 to 0.20 µm, for example.

Reference is now made to FIG. 1 and FIG. 2 to describe the trailing shield 16, the first side shield 15A, the second side shield 15B and the leading shield 14 in detail. As shown in FIG. 1 and FIG. 2, the trailing shield 16 has an end face 16a located in the medium facing surface 80 at a position on the trailing side. i.e. the front side in the direction T of travel of the recording medium 90, relative to the end face 12a of the main pole 12. The leading shield 14 has an end face 14a located in the medium facing surface 80 at a position on the leading side, i.e., the rear side in the direction T of travel of the recording medium 90, relative to the end face 12a of the main pole 12. As shown in FIG. 1, the first side shield 15A has an end face 15Aa located in the medium facing surface 80, and a top surface 15Ab located at the front-side end of the first side shield 15A in the direction T of travel of the recording medium 90. The second side shield 15B has an end face 15Ba located in the medium facing surface 80, and a top surface 15Bb located at the front-side end of the second side shield 15B in the direction T of travel of the recording medium 90. The end face 15Aa of the first side shield 15A and the end face 15Ba of the second side shield 15B are located on opposite sides of the end face 12a of the main pole 12 in the track width direction TW. In the medium facing surface 80, the end faces 14a, 15Aa, 15Ba and 16a are arranged to surround the end face 12a of the main pole 12.

In the present embodiment, the top surface 15Ab of the first side shield 15A and the top surface 15Bb of the second side shield 15B are coplanar with each other. The second portion 16B of the trailing shield 16 is located on the top surface 15Ab of the first side shield 15A. The third portion 16C of the trailing shield 16 is located on the top surface 15Bb of the second side shield 15B. As mentioned previously, the first portion 16A of the trailing shield. 16 is located on the trailing gap section 19A.

As shown in FIG. 1 and FIG. 2, the first portion 16A has a first end face 16Aa located in the medium facing surface 80 and a first top surface 16Ab. The first end face 16Aa is on the front side in the direction T of travel of the recording medium 90 relative to the end face 12a of the main pole 12. The first top surface 16Ab is located at the front-side end of the first portion 16A in the direction T of travel of the recording medium 90. As shown in FIG. 1, the second portion 16B has a second end face 16Ba located in the medium facing surface 80 and a second top surface 16Bb located at the front-side end of the second portion 16B in the direction T of travel of the recording medium 90. The third portion 16C has a third end face 16Ca located in the medium facing surface 80 and a third top surface 16Cb located at the front-side end of the third portion 16C in the direction T of travel of the recording medium 90. The second end face 16Ba and the third end face 16Ca are located on opposite sides of the first end face 16Aa in the track width direction TW.

As shown in FIG. 1, the first to third top surfaces 16Ab, 16Bb and 16Cb are coplanar with each other. The fourth portion 16D of the trailing shield 16 lies on the first to third top surfaces 16Ab, 16Bb and 16Cb, and has a fourth end face 16Da located in the medium facing surface 80. The fourth portion 16D includes the seed layer 16D1 lying on the first to third top surfaces 16Ab, 16Bb and 16Cb, and the magnetic layer 16D2 lying on the seed layer 16D1. The magnetic layer 16D2 constitutes most part of the fourth portion 16D. Each of the seed layer 16D1 and the magnetic layer 16D2 has an end face located in the medium facing surface 80. The fourth end face 16Da is constituted by the end face of the seed layer 16D1 and the end face of the magnetic layer 16D2. The end face 16a of the trailing shield 16 is constituted by the first to fourth end faces 16Aa, 16Ba, 16Ca and 16Da.

Materials usable to form the write shield 13 will now be described in detail. First, magnetic materials usable to form the first to fourth portions 16A, 16B, 16C and 16D of the trailing shield 16 will be described. In the present embodiment, the first portion 16A is higher in saturation flux density than the second to fourth portions 16B, 16C and 16D. For example, the magnetic material forming the first portion 16A may be CoFe having a saturation flux density of about 2.4 T, whereas the magnetic material forming the second to fourth portions 16B, 16C and 16D may be FeNi having a saturation flux density of about 1.6 T. The seed layer 16D1, which has a different property from that of the magnetic layer 16D2 of the fourth portion 16D, is present between the magnetic layer 16D2 of the fourth portion 16D and the first to third top surfaces 16Ab, 16Bb and 16Cb of the first to third portions 16A, 16B and 16C. Furthermore, the first portion 16A, which is higher in saturation flux density than the second portion 16B and the third portion 16C, is present between the second portion 16B and the third portion 16C. Because of the foregoing, the second to fourth portions 16B, 16C and 16D are distinguishable as different portions from each other even when the magnetic layer 16D2 of the fourth portion 16D is formed of the same magnetic material as the second and third portions 16B and 16C.

Next, materials usable to form the fifth portion 16E of the trailing shield 16 will be described. The fifth portion 16E may be formed of the same magnetic material as the second to fourth portions 16B, 16C and 16D, or of the same magnetic material as the first portion 16A. In the latter case, the first return path section 40 may also be formed of the same magnetic material as the first portion 16A.

Next, materials usable to form the intermediate film 64 of the trailing shield 16 will be described in detail. The intermediate film 64 is formed of a nonmagnetic material. The intermediate film 64 may be an oxide film containing oxygen and an element contained in the magnetic material used to form the magnetic layer 16D2. The thickness and composition of the intermediate film 64 as the oxide film can be identified by observing cross sections of the intermediate film 64 with a transmission electron microscope (TEM) and analyzing the composition of the intermediate film 64 by electron energy loss spectroscopy (EELS), for example.

The intermediate film 64 may be a deposition film instead of the oxide film. In this case, the nonmagnetic material used to form the intermediate film 64 may be an insulating material or a nonmagnetic metal material. Alumina is an example of an insulating material that can be used to form the intermediate film 64. Ru is an example of a nonmagnetic metal material that can be used to form the intermediate film 64.

The write shield 13 excluding the trailing shield 16 is formed of the same magnetic material as the second to fourth portions 16B, 16C and 16D, for example.

Reference is now made to FIG. 1 and FIG. 2 to describe the positional relationships of the first and second nonmagnetic layers 61 and 62 with the main pole 12 and the first to third portions 16A, 16B and 16C. As shown in FIG. 2, the first nonmagnetic layer 61 is located on the front side in the direction T of travel of the recording medium 90 relative to the main pole 12, and is at a greater distance from the medium facing surface 80 than is the first portion 16A. The first nonmagnetic layer 61 has a top surface 61a located at the front-side end of the first nonmagnetic layer 61 in the direction T of travel of the recording medium 90. The top surface 61a of the first nonmagnetic layer 61 is coplanar with the first to third top surfaces 16Ab, 16Bb and 16Cb of the first to third portions 16A, 16B and 16C shown in FIG. 1.

As shown in FIG. 2, the second nonmagnetic layer 62 is located on the front side in the direction T of travel of the recording medium 90 relative to the main pole 12, and is at a greater distance from the medium facing surface 80 than is the first portion 16A. At least part of the second nonmagnetic layer 62 is located between the first portion 16A and the first nonmagnetic layer 61. The second nonmagnetic layer 62 has a top surface 62a located at the front-side end of the second nonmagnetic layer 62 in the direction T of travel of the recording medium 90. The top surface 62a of the second nonmagnetic layer 62 is coplanar with the first to third top surfaces 16Ab, 16Bb and 16Cb of the first to third portions 16A, 16B and 16C shown in FIG. 1 and the top surface 61a of the first nonmagnetic layer 61 shown in FIG. 2.

Now, functions and effects specific to the magnetic head according to the present embodiment will be described. In the present embodiment, the trailing shield 16 includes the first portion 16A which is higher in saturation flux density than the second to fourth portions 16B, 16C and 16D. By virtue of this, it is possible to achieve a higher write magnetic field strength at or near the first side of the end face 12a of the main pole 12 when compared with the case where the first portion 16A has a saturation flux density lower than or equal to that of each of the second to fourth portions 16B, 16C and 16D. Further, it is possible to increase the gradient of change in the write magnetic field strength at or near the first side of the end face 12a of the main pole 12 in the distribution of the write magnetic field strength in the direction in which the tracks extend. The present embodiment thus allows improvement of write characteristics.

Further, the present embodiment makes it possible to prevent the occurrence of unwanted erasure attributable to the fourth portion 16D. This will be described in detail below with reference to FIG. 1 and FIG. 2. As will be detailed later, the fourth portion 16D is formed by plating. In FIG. 1 and FIG. 2, the hollow arrows indicate the crystal growth direction of the fourth portion 16D formed by plating. In the present embodiment, the first to third top surfaces 16Ab, 16Bb and 16Cb of the first to third portions 16A, 16B and 16C are coplanar with each other, and the fourth portion 16D lies on the first to third top surfaces 16Ab, 16Bb and 16Cb. The present embodiment thus allows the fourth portion 16D to be formed on a flat underlayer constituted by the first to third top surfaces 16Ab, 16Bb and 16Cb. This makes it possible to form the fourth portion 16D such that the entirety or most part of the fourth portion 16D has a uniform crystal growth direction.

In the present embodiment, the fourth portion 16D particularly includes the seed layer 16D1 and the magnetic layer 16D2. The seed layer 16D1 is formed on the flat underlayer constituted by the first to third top surfaces 16Ab, 16Bb and 16Cb. The magnetic layer 16D2 is formed on the seed layer 16D1 by plating. This allows the magnetic layer 16D2, which constitutes most part of the fourth portion 16D, to have few grain boundaries or defects and have a uniform crystal growth direction perpendicular to the top surface of the seed layer 16D1.

In the fourth portion 16D formed as above, magnetization rotation and domain wall displacement proceed smoothly, so that the occurrence of leakage magnetic field from the fourth end face 16Da of the fourth portion 16D toward the outside of the medium facing surface 80 is prevented. The present embodiment thus allows prevention of the occurrence of unwanted erasure attributable to the fourth portion 16D.

As will be detailed later, the second and third portions 16B and 16C are also formed by plating. In FIG. 1, the hollow arrows in the second and third portions 16B and 16C indicate the crystal growth direction of the second and third portions 16B and 16C formed by plating. In the present embodiment, the top surface 15Ab of the first side shield 15A and the top surface 15Bb of the second side shield 15B are coplanar with each other. The second portion 16B is located on the top surface 15Ab of the first side shield 15A. The third portion 16C is located on the top surface 15Bb of the second side shield 15B. The present embodiment thus allows the second portion 16B and the third portion 16C to be formed on one flat surface including the top surfaces 15Ab and 15Bb. This makes it possible to form the second and third portions 16B and 16C such that the entirety or most part of the second portion 16B and the entirety or most part of the third portion 16C have the same crystal growth direction perpendicular to the aforementioned one flat surface. As a result, for the same reason as described above in relation to the fourth portion 16D, it is possible to prevent the occurrence of unwanted erasure attributable to the second and third portions 16B and 16C.

As will be detailed later, the fifth portion 16E and the magnetic layers 42 and 44 are also formed by plating. In FIG. 2, the hollow arrows in the fifth portion 16E and the magnetic layers 42 and 44 indicate the crystal growth direction of the fifth portion 16E and the magnetic layers 42 and 44 formed by plating.

The other effects of the present embodiment will now be described. In the present embodiment, not only the magnetic layer 16D2 but also the fifth portion 16E of the trailing shield 16 is provided on the seed layer 16D1. The intermediate film 64 formed of a nonmagnetic material is interposed between the magnetic layer 16D2 and the fifth portion 16E. Thus, the magnetization of each of the magnetic layer 16D2 and the fifth portion 16E is less likely to be oriented in the direction D perpendicular to the medium facing surface 80. According to the present embodiment, this also serves to prevent the occurrence of unwanted erasure.

A manufacturing method for the magnetic head according to the present embodiment will now be described. As shown in FIG. 3 and FIG. 4, the manufacturing method for the magnetic head according to the present embodiment starts with forming the insulating layer 2, the first read shield layer 3 and the first read shield gap film 4 in this order into a stack on the substrate 1. Then, the MR element 5 and leads (not illustrated) connected to the MR element 5 are formed on the first read shield gap film 4. The MR element 5 and the leads are then covered with the second read shield gap film 6. Next, the second read shield layer 7, the nonmagnetic layer 71, the middle shield layer 72 and the nonmagnetic layer 73 are formed in this order into a stack on the second read shield gap film 6.

Next, the magnetic layer 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the magnetic layer 31 is exposed. The magnetic layers 32 and 33 are then formed on the magnetic layer 31 by frame plating, for example. The insulating film 52 is then formed over the entire top surface of the stack. The second coil portion 10 is then formed by frame plating, for example. Next, the non-illustrated insulating layer is formed over the entire top surface of the stack. The insulating film 52 and the non-illustrated insulating layer are then polished by, for example, CMP, until the second coil portion 10 and the magnetic layers 32 and 33 are exposed.

Then, the insulating layer 53 is formed over the entire top surface of the stack. The insulating layer 53 is then selectively etched to form therein a first opening for exposing the top surface of the magnetic layer 32, a second opening for exposing the top surface of the magnetic layer 33, and a third opening for exposing the coil connection 10E (see FIG. 5) of the second coil portion 10. Then, a magnetic layer 15P is formed on the magnetic layer 32 at the location of the first opening, the magnetic layer 34 is formed on the magnetic layer 33 at the location of the second opening, and the first connection layer (not illustrated) is formed on the coil connection 10E at the location of the third opening, by frame plating, for example. The magnetic layer 15P includes the leading shield 14, the first side shield 15A, the second side shield 15B, and a portion to be removed 15C which will be removed in the step of forming the medium facing surface 80 to be described later. The magnetic layer 15P and the portion to be removed 15C are shown in FIG. 7C and FIG. 8C to be described later. Next, the nonmagnetic layer 54 is formed over the entire top surface of the stack. The nonmagnetic layer 54 is then polished by, for example, CMP, until the magnetic layers 15P and 34 and the first connection layer are exposed.

Next, the magnetic layer 15P and the nonmagnetic layer 54 are taper-etched in part by, for example, ion beam etching (hereinafter referred to as IBE) so as to form in the magnetic layer 15P and the nonmagnetic layer 54 a receiving section for receiving a part of the main pole 12 to be formed later. The magnetic layer 15P excluding the portion to be removed 15C thereby becomes the leading shield 14, the first side shield 15A and the second side shield. This etching also etches the magnetic layer 34 and the first connection layer in part.

Next, the first gap layer 18 is formed to cover the leading shield 14, the first side shield 15A and the second side shield 15B. Where alumina is selected as the material of the first gap layer 18, the first gap layer 18 is formed by atomic layer deposition, for example. Where Ru is selected as the material of the first gap layer 18, the first gap layer 18 is formed by chemical vapor deposition, for example. Next, the first gap layer 18 is selectively etched to form therein an opening for exposing the top surface of the magnetic layer 34 and an opening for exposing the top surface of the first connection layer.

Next, an initial main pole to later become the main pole 12, and the second connection layer (not illustrated) are formed by frame plating, for example. The initial main pole is formed such that a part thereof is received in the receiving section. The initial main pole and the second connection layer are formed such that their top surfaces are higher in level than portions of the first gap layer 18 lying on the first and second side shields 15A and 15B. Next, the nonmagnetic layer 60 is formed over the entire top surface of the stack. The initial main pole, the second connection layer, the first gap layer 18 and the nonmagnetic layer 60 are then polished by, for example, CMP, until the first and second side shields 15A and 15B are exposed.

Reference is now made to FIG. 7A to FIG. 16B to describe a series of steps to be performed after the foregoing step up to the formation of the nonmagnetic layer 67. FIG. 7A to FIG. 16B each show a stack formed in the process of manufacturing the magnetic head. Fig. nA (n is an integer between 7 and 16 inclusive) shows a cross section perpendicular to the medium facing surface 80 and to the top surface 1a of the substrate 1, particularly the main cross section. Fig. nB shows a cross section of the stack taken at the location at which the medium facing surface 80 is to be formed. Fig. nA and Fig. nB omit the illustration of portions located below the leading shield 14, the magnetic layer 34 and the insulating layer 53. FIG. 7C and FIG. 8C each show the top surface of the stack. In FIG. 7C and FIG. 8C, the symbol "ABS" indicates the location at which the medium facing surface 80 is to be formed. In FIG. 7C, the magnetic layer 15P with the receiving section formed therein is hatched.

Figure 7A:
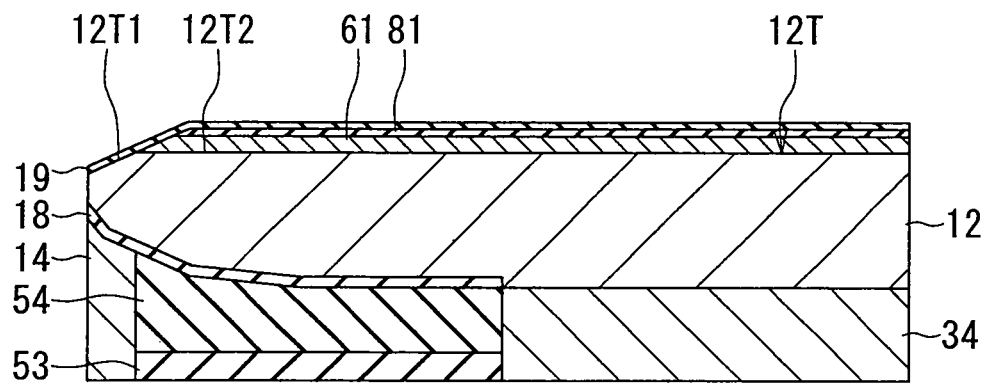
FIG. 7A to FIG. 7C are explanatory diagrams showing a step of a manufacturing method for the magnetic head according to the first embodiment of the invention.
Figure 7B:
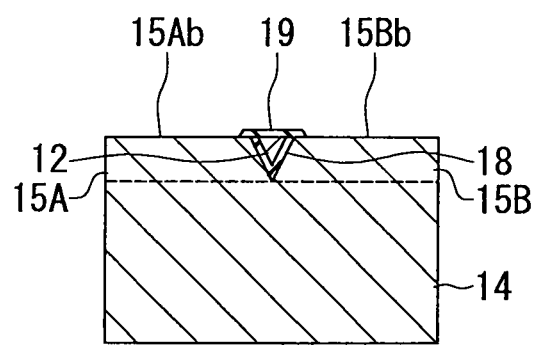
Figure 7C:
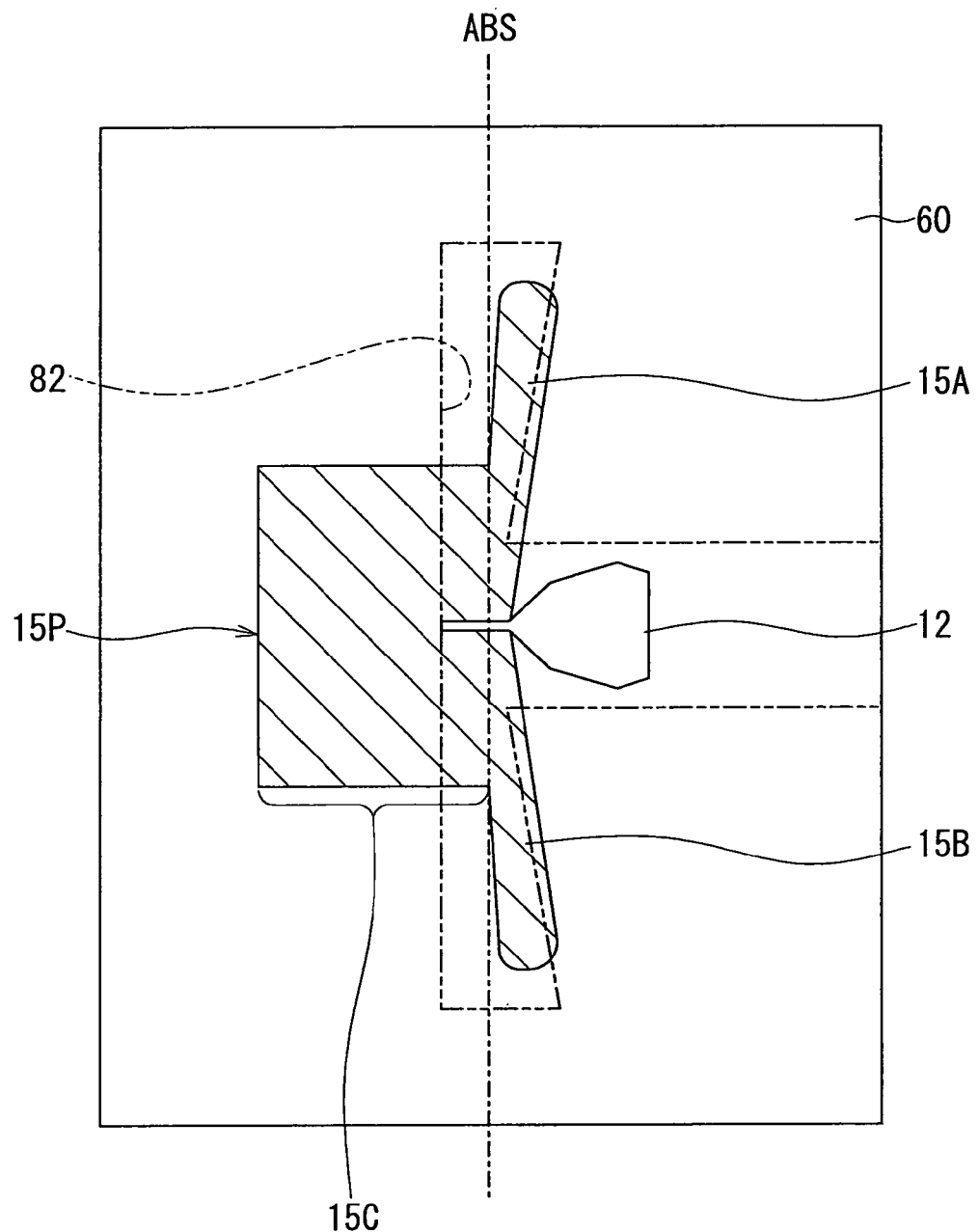

In the step shown in FIG. 7A to FIG. 7C, first, the first nonmagnetic layer 61 is formed over the initial main pole, the first side shield 15A and the second side shield 15B. Then, the insulating layer 81 is formed on the first nonmagnetic layer 61. The insulating layer 81 does not cover a part of the top surface of the first nonmagnetic layer 61 near the location ABS at which the medium facing surface 80 is to be formed. Then, using the insulating layer 81 as an etching mask, the initial main pole, the first side shield 15A, the second side shield 15B, the nonmagnetic layer 60 and the first nonmagnetic layer 61 are etched in part by, for example, IBE so as to provide the initial main pole with the inclined portion 12T1. Of the top surface of the initial main pole thus etched, the part covered with the first nonmagnetic metal layer 61 makes the flat portion 12T2. The initial main pole thereby becomes the main pole 12.

Next, a nonmagnetic film including the trailing gap section 19A is formed over the entire top surface of the stack by sputtering or chemical vapor deposition, for example. The nonmagnetic film is formed to cover the first and second side shields 15A and 15B and the main pole 12. Then, part of the nonmagnetic film is selectively etched by, for example, IBE or reactive ion etching (hereinafter referred to as RIE) so that the trailing gap section 19A is formed near the location ABS at which the medium facing surface 80 is to be formed. This step will hereinafter be referred to as the etching step. In the etching step, the nonmagnetic film is etched to expose a part of each of the top surfaces 15Ab and 15Bb of the first and second side shields 15A and 15B and at least part of the top surface of the portion to be removed 15C. The etching step makes the nonmagnetic film into the second gap layer 19. FIG. 7C omits the illustration of the second gap layer 19, the first nonmagnetic layer 61 and the insulating layer 81. In FIG. 7C, numeral 82 represents a seed layer to be formed later.

Figure 8A:
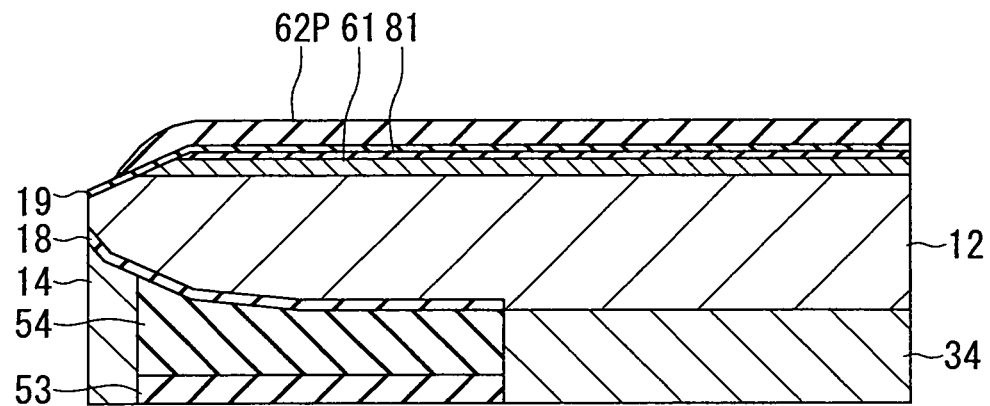
FIG. 8A to FIG. 8C are explanatory diagrams showing a step that follows the step shown in FIG. 7A to FIG. 7C.
Figure 8B:
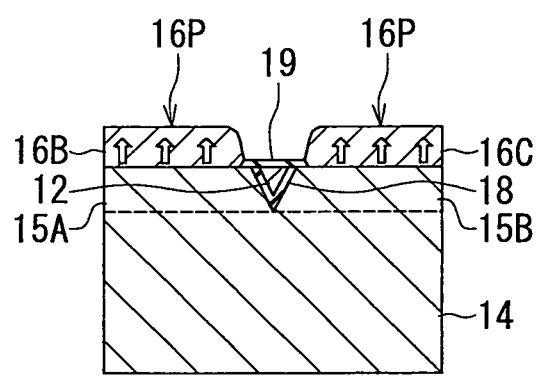
Figure 8C:
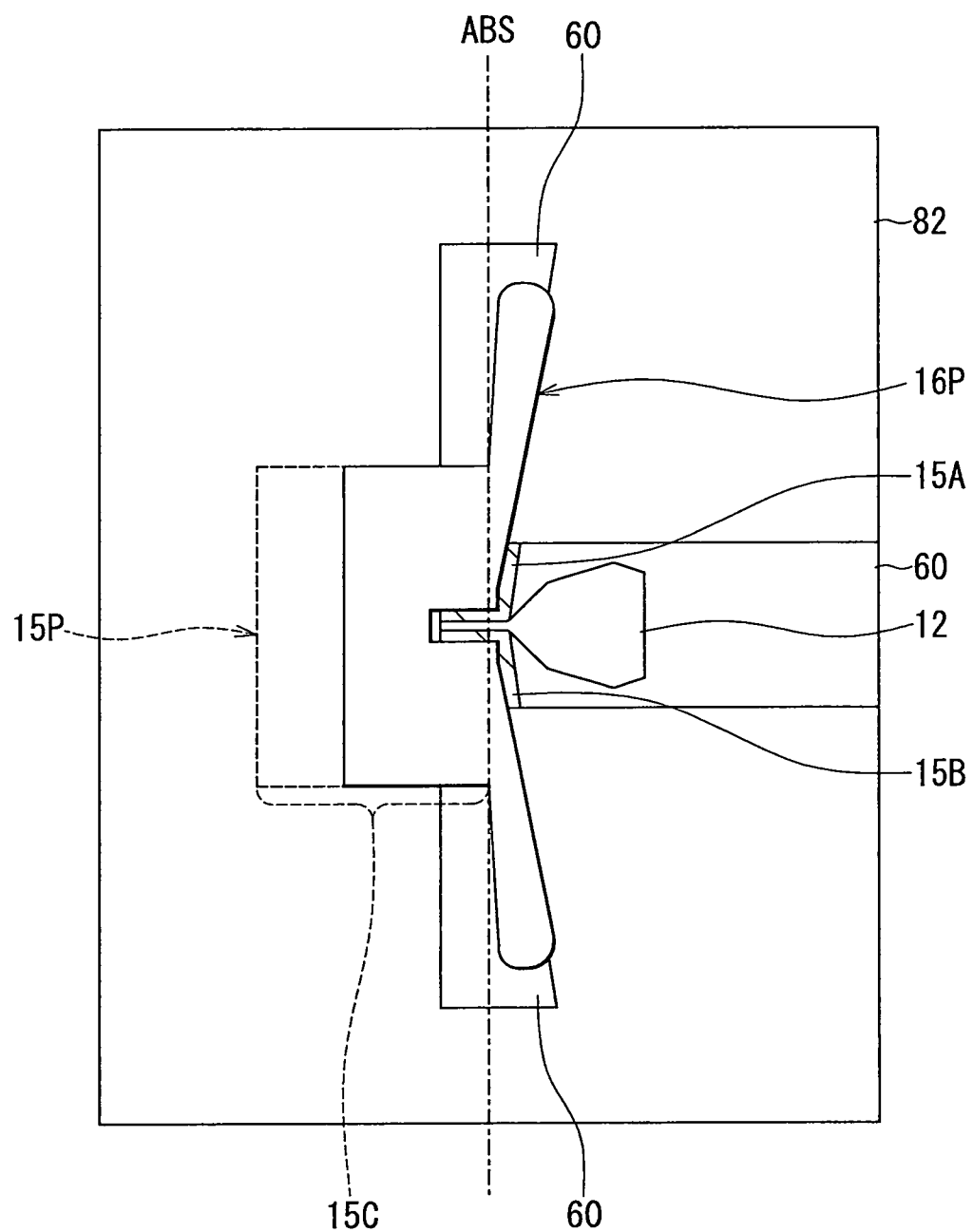

FIG. 8A to FIG. 8C show the next step. In this step, first, an initial nonmagnetic layer 62P is formed on the second gap layer 19 to cover the first nonmagnetic layer 61. The initial nonmagnetic layer 62P will later become the second nonmagnetic layer 62. The initial nonmagnetic layer 62P may be formed by a lift-off process, or by first forming a nonmagnetic film on the second gap layer 19 and then etching a part of the nonmagnetic film. Next, a seed layer 82 is formed on the magnetic layer 15P and the second gap layer 19 by, for example, a lift-off process so as to be electrically connected to at least the portion to be removed 15C of the magnetic layer 15P with the receiving section formed therein. The seed layer 82 covers neither of a part of the top surface of the magnetic layer 15P near the main pole 12 and a part of the top surface of the magnetic layer 15P near the location ABS at which the medium facing surface 80 is to be formed. Next, a first magnetic film 16P including the second portion 16B and the third portion 16C of the trailing shield 16 is formed on the first and second side shields 15A and 15B. In the present embodiment, the first magnetic film 16P is formed by plating, using the first side shield 15A, the second side shield 15B and the seed layer 82 as a seed and a cathode. The first magnetic film 16P is formed such that its top surface is higher in level than the second and third top surfaces 16Bb and 16Cb of the second and third portions 16B and 16C to be formed later.

In FIG. 8B, the hollow arrows indicate the crystal growth direction of the second and third portions 16B and 16C included in the first magnetic film 16P. As shown in FIG. 8B, the entirety or most part of the second portion 16B and the entirety or most part of the third portion 16C have the same crystal growth direction perpendicular to the top surfaces 15Ab and 15Bb of the first and second side shields 15A and 15B.

Figure 9A:
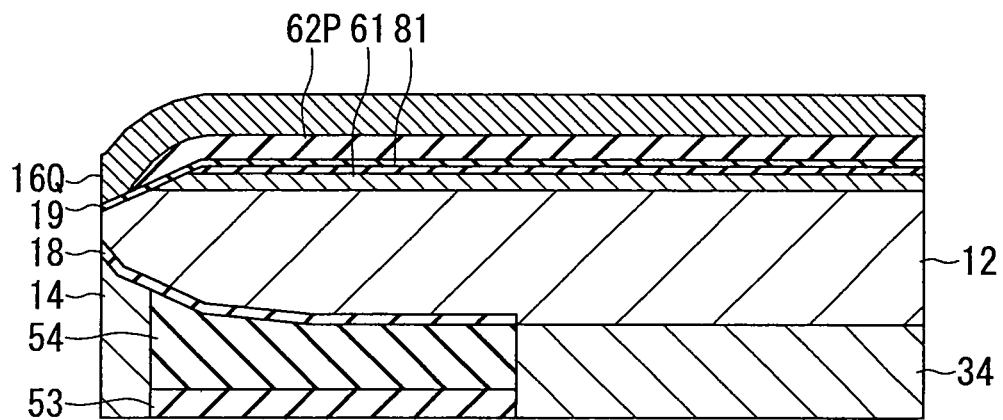
FIG. 9A and FIG. 9B are cross-sectional views showing a step that follows the step shown in FIG. 8A to FIG. 8C.
Figure 9B:
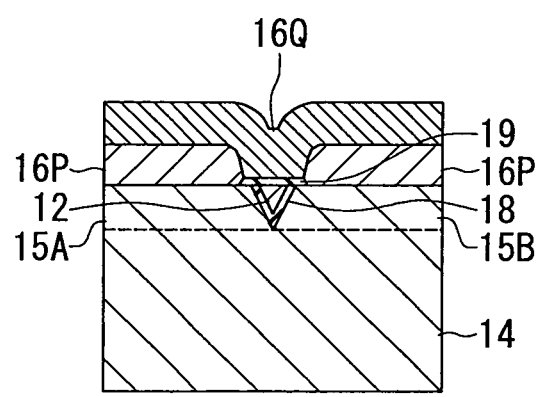

FIG. 9A and FIG. 9B show the next step. In this step, a second magnetic film 16Q including the first portion 16A of the trailing shield 16 is formed on the top surface of the stack by sputtering or ion beam deposition, for example.

Figure 10A:
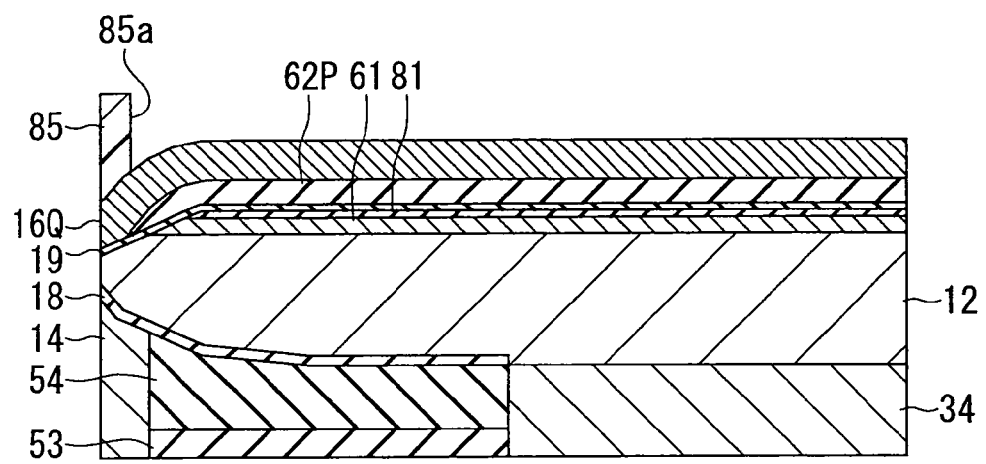
FIG. 10A and FIG. 10B are cross-sectional views showing a step that follows the step shown in FIG. 9A and FIG. 9B.
Figure 10B:
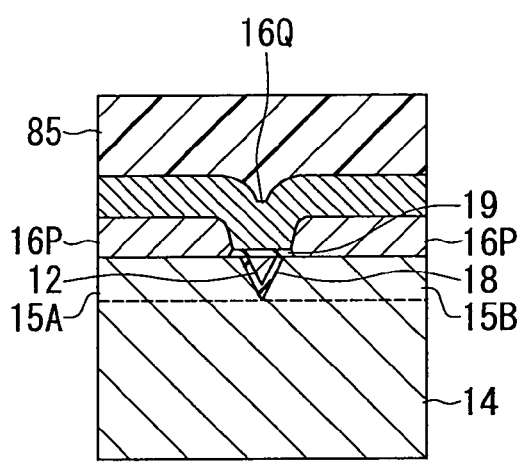

FIG. 10A and FIG. 10B show the next step. In this step, a photoresist mask 85 is formed on the top surface of the stack. The photoresist mask 85 is formed by patterning a photoresist layer. Other photoresist masks to be used in later steps will be formed in the same manner as the photoresist mask 85. The photoresist mask 85 has a wall face 85a defining the length of the first portion 16A, which will be formed later, in the direction D perpendicular to the medium facing surface 80.

Figure 11A:
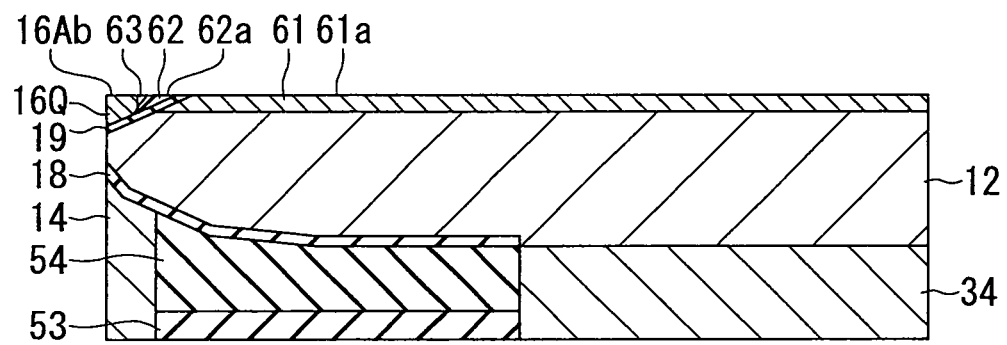
FIG. 11A and FIG. 11B are cross-sectional views showing a step that follows the step shown in FIG. 10A and FIG. 10B.
Figure 11B:
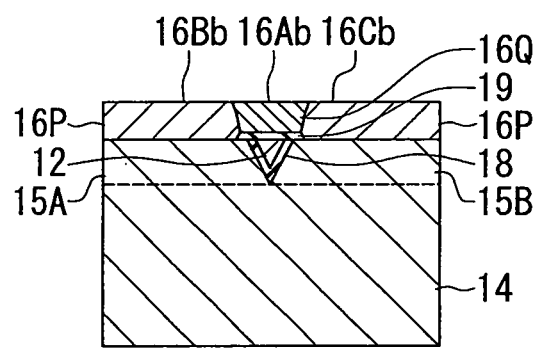

FIG. 11A and FIG. 11B show the next step. In this step, first, the second magnetic film 16Q is etched by, for example, IBE using the photoresist mask 85. The length of the first portion 16A in the direction D perpendicular to the medium facing surface 80 is defined by this etching. The photoresist mask 85 is then removed. Next, the third nonmagnetic layer 63 is formed over the entire top surface of the stack. Then, the first magnetic film 16P, the second magnetic film 16Q, the second gap layer 19, the initial nonmagnetic layer 62P, the third nonmagnetic layer 63 and the insulating layer 81 are polished by CMP, for example. This step will hereinafter be referred to as the polishing step. In the polishing step, the first and second magnetic films 16P and 16Q are polished so as to form the first to third top surfaces 16Ab, 16Bb and 16Cb of the first to third portions 16A, 16B and 16C. In the polishing step, the first nonmagnetic layer 61 is used as a polishing stopper in polishing the first and second magnetic films 16P and 16Q. This allows accurate definition of the level of the first to third top surfaces 16Ab, 16Bb and 16Cb. The top surface 61a of the first nonmagnetic layer 61 after the polishing is coplanar with the first to third top surfaces 16Ab, 16Bb and 16Cb. In the polishing step, the initial nonmagnetic layer 62P is polished together with the first and second magnetic films 16P and 16Q so that the initial nonmagnetic layer 62P becomes the second nonmagnetic layer 62. The top surface of the initial nonmagnetic layer 62P thus polished, i.e., the top surface 62a of the second nonmagnetic layer 62, is coplanar with the first to third top surfaces 16Ab, 16Bb and 16Cb and the top surface 61a of the first nonmagnetic layer 61.

Figure 12A:
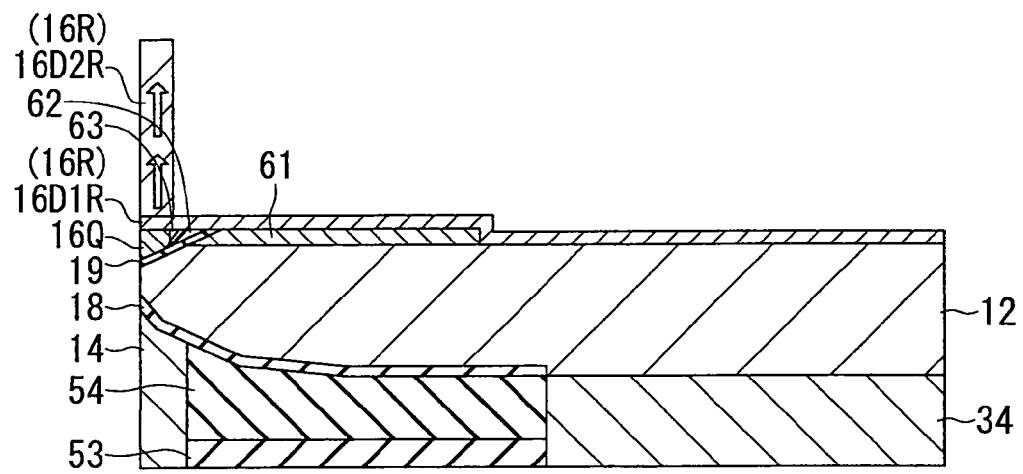
FIG. 12A and FIG. 12B are cross-sectional views showing a step that follows the step shown in FIG. 11A and FIG. 11B.
Figure 12B:
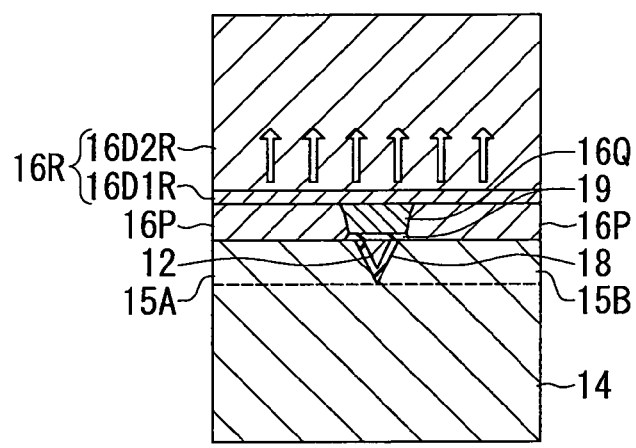

FIG. 12A and FIG. 12B show the next step. In this step, first, the first nonmagnetic layer 61 is selectively etched to expose the second portion of the top surface 12T of the main pole 12 and the second gap layer 19 is selectively etched to expose the top surface of the second connection layer, by performing IBE, for example. In the step shown in FIG. 12A and FIG. 12B, a third magnetic film 16R including the fourth portion 16D of the trailing shield 16 is then formed on the first and second magnetic films 16P and 16Q having undergone the polishing. In the step of forming the third magnetic film 16R, first, a seed layer 16D1R is formed on the first and second magnetic films 16P and 16Q. The seed layer 16D1R will later become the seed layer 16D1 and the seed layer 41. Then, using the seed layer 16D1R as a seed and a cathode, a magnetic layer 16D2R including the magnetic layer 16D2 of the fourth portion 16D is formed on the seed layer 16D1R by plating.

In FIG. 12A and FIG. 12B, the hollow arrows in the magnetic layer 16D2R indicate the crystal growth direction of the magnetic layer 16D2R. As shown in FIG. 12A and FIG. 12B, the crystal growth direction of the magnetic layer 16D2R is perpendicular to the top surface of the seed layer 16D1R.

Figure 13A:
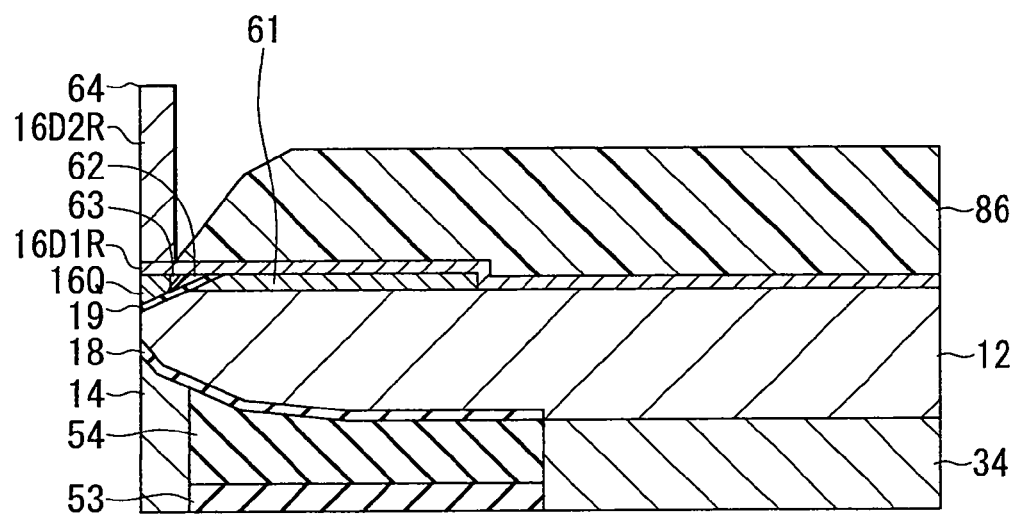
FIG. 13A and FIG. 13B are cross-sectional views showing a step that follows the step shown in FIG. 12A and FIG. 12B.
Figure 13B:
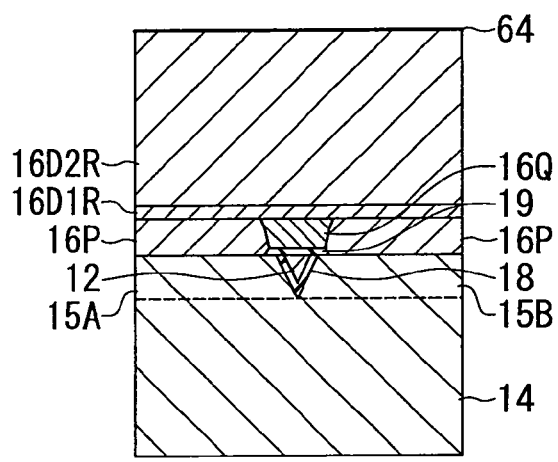

Next, the intermediate film 64 is formed. FIG. 13A and FIG. 13B illustrate the case where the intermediate film 64 is a deposition film. In this case, first, a photoresist mask 86 is formed on the top surface of the stack. The photoresist mask 86 does not cover the magnetic layer 16D2R. Next, the intermediate film 64 is formed on the surface of the magnetic layer 16D2R by ion beam deposition, for example. In FIG. 13A and FIG. 13B the intermediate film 64 is shown by thick lines. Any figures similar to FIG. 13A and FIG. 13B, to be referred to for descriptions below, will also employ the same way of illustration of the intermediate film 64 as in FIG. 13A and FIG. 13B. The photoresist mask 86 is then removed.

A part of the magnetic layer 16D2R including the surface of the magnetic layer 16D2R is oxidized into an oxide film after the formation of the magnetic layer 16D2R. A part of the oxide film may be used as the intermediate film 64 instead of forming the intermediate film 64 as a deposition film as described above.

Figure 14A:
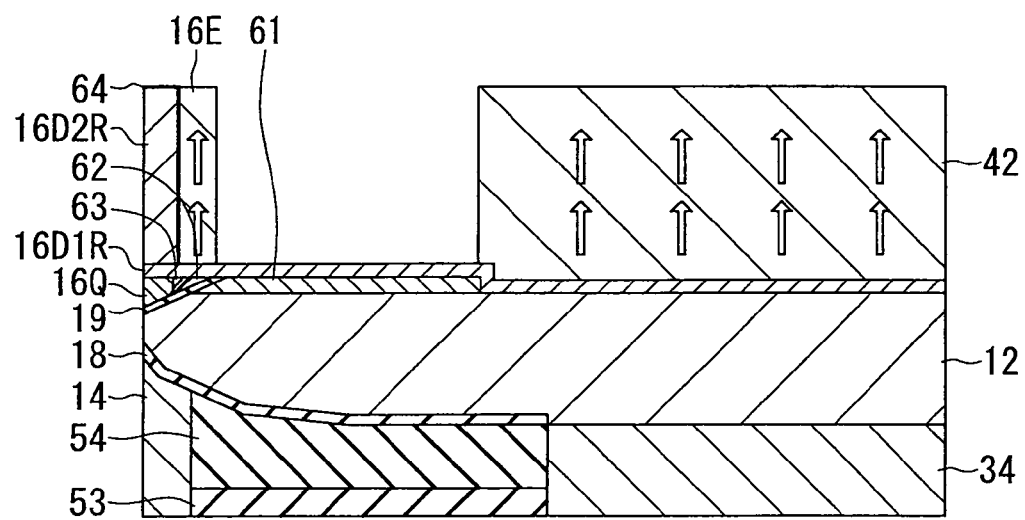
FIG. 14A and FIG. 14B are cross-sectional views showing a step that follows the step shown in FIG. 13A and FIG. 13B.
Figure 14B:
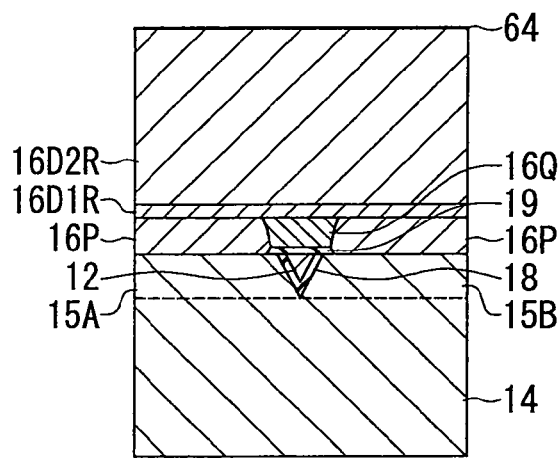

FIG. 14A and FIG. 14B show the next step. In this step, the fifth portion 16E and the magnetic layer 42 are formed on the seed layer 16D1R by plating, using the seed layer 16D1R as a seed and a cathode. In FIG. 14A, the hollow arrows indicate the crystal growth direction of the fifth portion 16E and the magnetic layer 42.

Figure 15A:
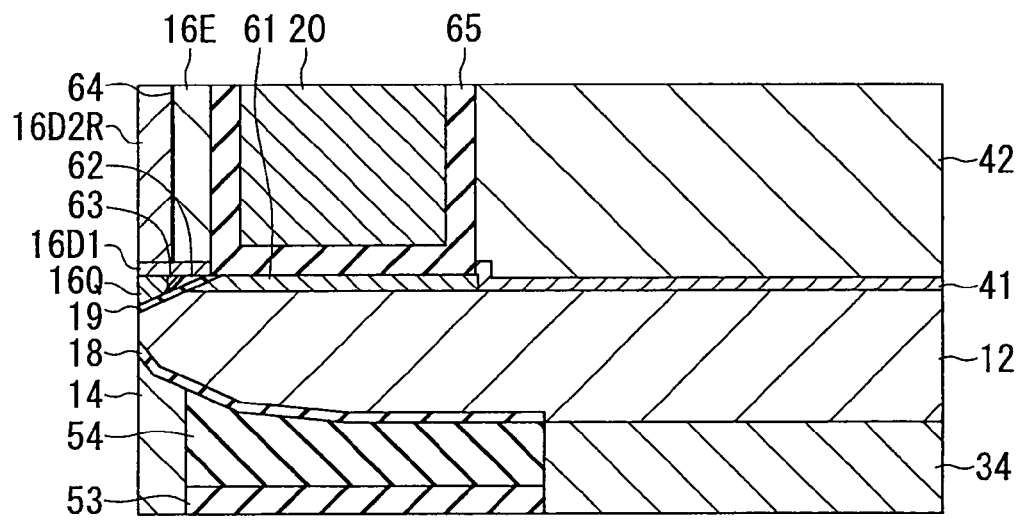
FIG. 15A and FIG. 15B are cross-sectional views showing a step that follows the step shown in FIG. 14A and FIG. 14B.
Figure 15B:
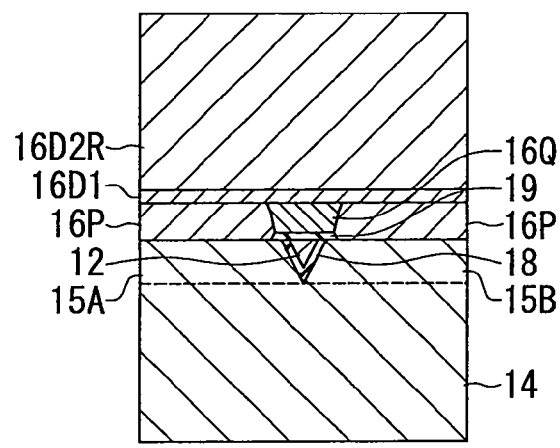

FIG. 15A and FIG. 15B show the next step. In this step, first, a part of the seed layer 16D1R that is not covered with the magnetic layers 16D2R and 42 and the fifth portion 16E is removed. This makes the seed layer 16D1R into the seed layer 16D1 and the seed layer 41. Then, the insulating film 65 is formed over the entire top surface of the stack by atomic layer deposition, for example. The insulating film 65 is then selectively etched to form therein an opening for exposing the top surface of the second connection layer. Next, the first coil portion 20 is formed on the insulating film 65 and the second connection layer by frame plating, for example. Then, the non-illustrated nonmagnetic layer is formed over the entire top surface of the stack. The intermediate film 64, the insulating film 65 and the non-illustrated nonmagnetic layer are then polished by, for example, CMP, until the magnetic layers 16D2R and 42, the fifth portion 16E and the first coil portion 20 are exposed.

Figure 16A:
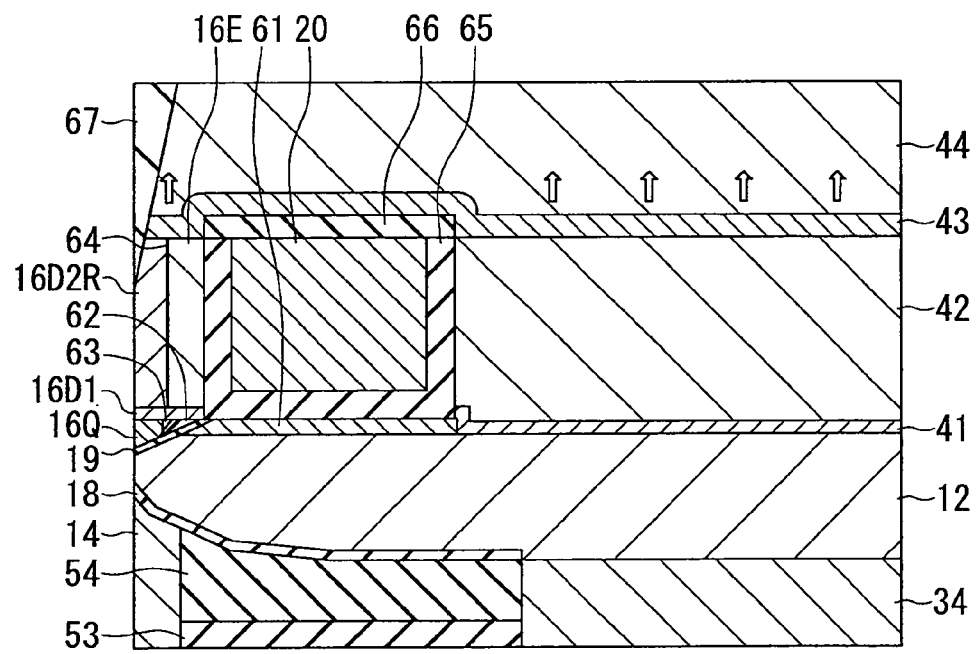
FIG. 16A and FIG. 16B are cross-sectional views showing a step that follows the step shown in FIG. 15A and FIG. 15B.
Figure 16B:
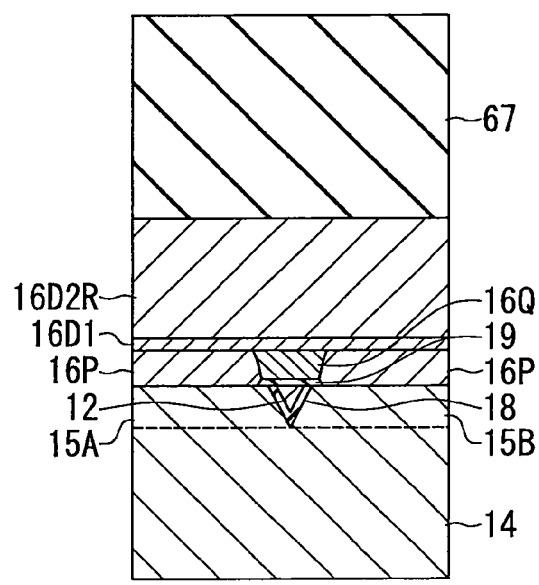

FIG. 16A and FIG. 16B show the next step. In this step, first, the insulating layer 66 is formed over the entire top surface of the stack. The insulating layer 66 is then selectively etched to form therein a first opening for exposing the top surfaces of the magnetic layer 16D2R and the fifth portion 16E, and a second opening for exposing the top surface of the magnetic layer 42. Next, the seed layer 43 is formed over the magnetic layers 16D2R and 42, the fifth portion 16E and the insulating layer 66. Then, using the seed layer 43 as a seed and a cathode, the magnetic layer 44 is formed on the seed layer 43 by plating. In FIG. 16A the hollow arrows indicate the crystal growth direction of the magnetic layer 44. Next, a part of the seed layer 43 that is not covered with the magnetic layer 44 is removed. The magnetic layer 44 is then etched by, for example, RIE or IBE to provide the magnetic layer 44 with the end face described previously. The magnetic layer 16D2R and the seed layer 43 are also etched in part during this etching. Next, the nonmagnetic layer 67 is formed over the entire top surface of the stack. The nonmagnetic layer 67 is then polished by, for example, CMP, until the magnetic layer 44 is exposed.

Now, steps to follow the step shown in FIG. 16A and FIG. 16B will be described with reference to FIG. 3 and FIG. 4. First, the protective layer 68 is formed to cover the entire top surface of the stack. Then, wiring, terminals and other components are formed on the protective layer 68, and the substrate 1 is cut near the location at which the medium facing surface 80 is to be formed. The cut surface is then polished to form the medium facing surface 80, and processing such as fabrication of flying rails is performed to complete the magnetic head. The formation of the medium facing surface 80 makes the first magnetic film 16P into the second and third portions 16B and 16C, makes the second magnetic film 16Q into the first portion 16A, and makes the magnetic layer 16D2R into the magnetic layer 16D2, thereby making the third magnetic film 16R into the fourth portion 16D.

If the entirety of the trailing shield 16 is formed of a magnetic material having a high saturation flux density, the end face 16a of the trailing shield 16 becomes more likely to protrude relative to the surface of its surrounding portion when the medium facing surface 80 is formed by polishing. As a result, the end face 12a of the main pole 12 cannot be brought close to the recording medium 90. To avoid this, the magnetic material used to form the trailing shield 16 preferably has a somewhat low saturation flux density. On the other hand, if the entirety of the trailing shield 16 is formed of a magnetic material having a low saturation flux density, it is not possible to increase the write magnetic field strength and the gradient of change in the write magnetic field strength at or near the first side of the end face 12a of the main pole 12. To cope with this, in the present embodiment, the first portion 16A is formed of a magnetic material higher in saturation flux density than the magnetic material used to form the second to fourth portions 16B, 16C and 16D. This makes it possible to increase the write magnetic field strength and the gradient of change in the write magnetic field strength at or near the first side of the end face 12a of the main pole 12 while preventing the entire end face 16a of the trailing shield 16 from protruding relative to the surface of its surrounding portion.

The manufacturing method for the magnetic head according to the present embodiment includes the steps of: forming the coil; forming the main pole 12; forming the write shield 13; forming the gap section 17; forming the first nonmagnetic layer 61; and forming the initial nonmagnetic layer 62P. The step of forming the write shield 13 includes the steps of: forming the trailing shield 16; forming the first and second side shields 15A and 15B; and forming the leading shield 14. The step of forming the trailing shield 16 includes the steps of: forming the first magnetic film 16P and the second magnetic film 16Q, the first magnetic film 16P including the second and third portions 16B and 16C, the second magnetic film 16Q including the first portion 16A; polishing the first and second magnetic films 16P and 16Q; and forming the third magnetic film 16R. In the present embodiment, the step of forming the first magnetic film 16P and the second magnetic film 16Q forms the second magnetic film 16Q after forming the first magnetic film 16P.

The step of forming the gap section 17 includes the step of forming the trailing gap section 19A and the step of forming the side gap section 18A. In the present embodiment, the side gap section 18A is formed by forming the first gap layer 18. The trailing gap section 19A is formed by forming the second gap layer 19.

Second Embodiment

Figure 17:
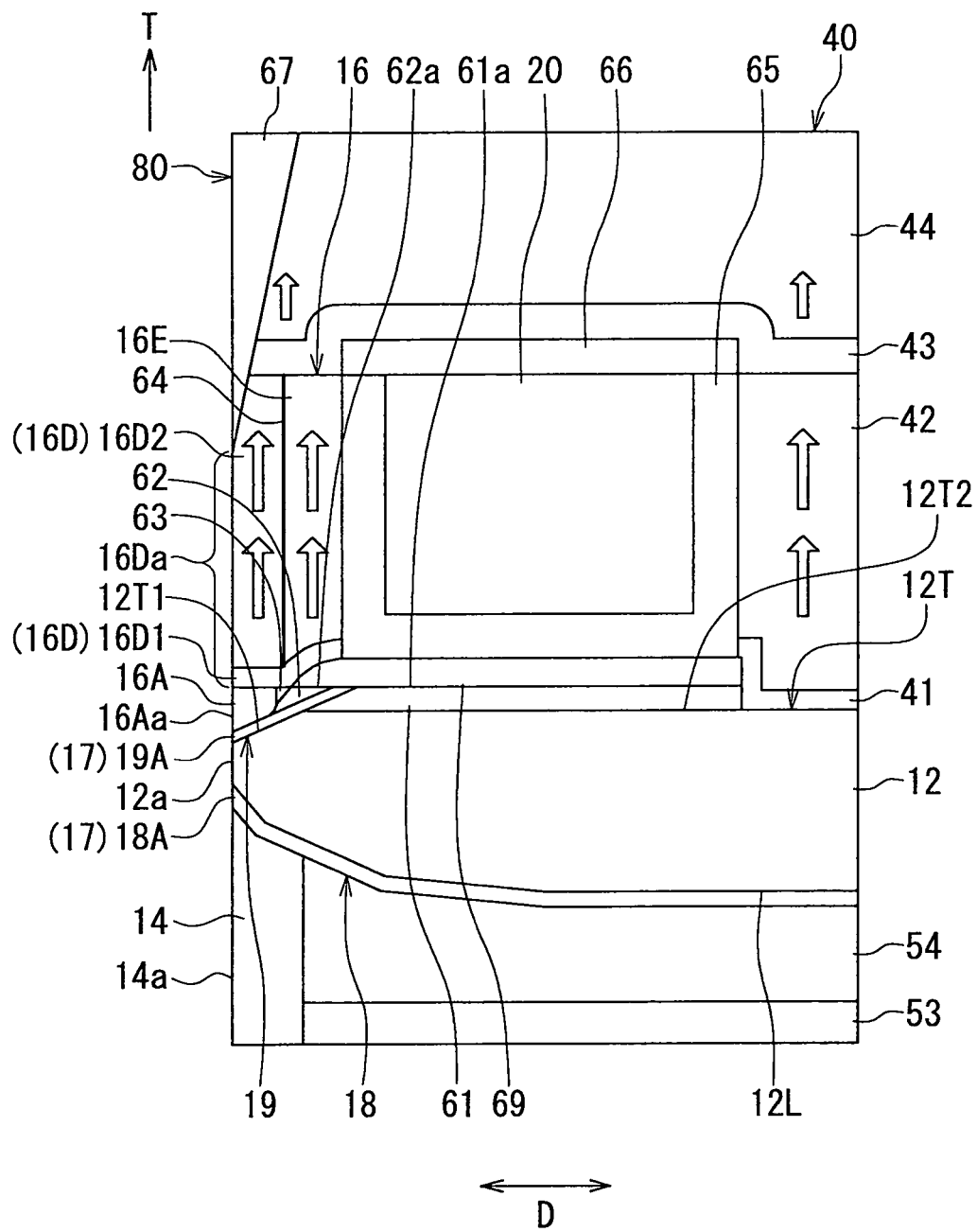
FIG. 17 is a cross-sectional view showing the main part of a magnetic head according to a second embodiment of the invention.

A magnetic head according to a second embodiment of the invention will now be described with reference to FIG. 17. FIG. 17 is a cross-sectional view showing the main part of the magnetic head according to the present embodiment. FIG. 17 shows a cross section perpendicular to the medium facing surface and to the top surface of the substrate, particularly the main cross section. The arrow labeled T in FIG. 17 indicates the direction of travel of the recording medium.

The magnetic head according to the present embodiment differs from the magnetic head according to the first embodiment in the following ways. The magnetic head according to the present embodiment includes a nonmagnetic layer 69 formed of a nonmagnetic material and interposed between the main pole 12 and each of the trailing shield 16 and the first coil portion 20. In the present embodiment, the nonmagnetic layer 69 lies on the second gap layer 19, the first nonmagnetic layer 61 and the second nonmagnetic layer 62. The nonmagnetic layer 69 has an end that is closest to the medium facing surface 80 and located at a distance from the medium facing surface 80. A part of the seed layer 16D1 of the fourth portion 16D of the trailing shield 16 and a part of the fifth portion 16E of the trailing shield 16 ride over the nonmagnetic layer 69. The insulating film 65 is interposed between the first coil portion 20 and the nonmagnetic layer 69. The nonmagnetic layer 69 is formed of alumina, for example. In the present embodiment, the aforementioned end of the nonmagnetic layer 69 is located closer to the medium facing surface 80 than is the second end of the inclined portion 12T1 of the top surface 12T of the main pole 12. The present embodiment allows an increase in the distance between the flat portion 12T2 of the top surface 12T of the main pole 12 and the fifth portion 16E of the trailing shield 16 by the nonmagnetic layer 69. The present embodiment thus makes it possible to prevent the write characteristics from being degraded by flux leakage from the main pole 12 to the fifth portion 16E.

As has been described in relation to the first embodiment, the fifth portion 16E may be formed of the same magnetic material as the second to fourth portions 16B, 16C and 16D of the trailing shield 16, or of the same magnetic material as the first portion 16A of the trailing shield 16. In the latter case, the first return path section 40 may also be formed of the same magnetic material as the first portion 16A. In the present embodiment, in particular, flux leakage from the main pole 12 to the fifth portion 16E can be prevented by the nonmagnetic layer 69 even when the fifth portion 16E has a high saturation flux density.

Figure 18:
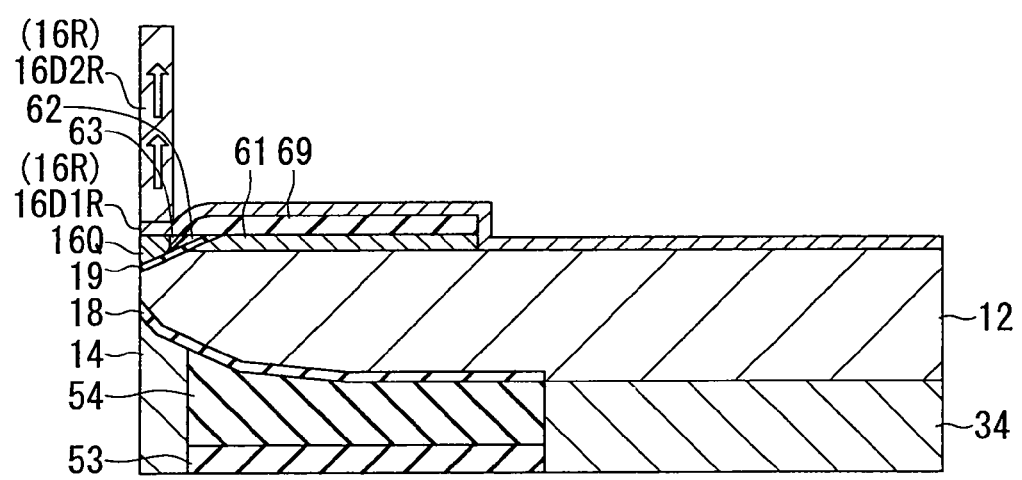
FIG. 18 is a cross-sectional view showing a step of a manufacturing method for the magnetic head according to the second embodiment of the invention.

A manufacturing method for the magnetic head according to the present embodiment will now be described with reference to FIG. 18. FIG. 18 illustrates a stack of layers formed in the process of manufacturing the magnetic head. FIG. 18 shows a cross section perpendicular to the medium facing surface 80 and to the top surface 1a of the substrate 1, particularly the main cross section. FIG. 18 omits the illustration of parts located below the leading shield 14, the magnetic layer 34 and the insulating layer 53.

The manufacturing method for the magnetic head according to the present embodiment is the same as the method according to the first embodiment up to the step shown in FIG. 11A and FIG. 11B. FIG. 18 shows the next step. In this step, first, the nonmagnetic layer 69 is formed over the second gap layer 19, the first nonmagnetic layer 61 and the second nonmagnetic layer 62 by a lift-off process, for example. Then, the first nonmagnetic layer 61 and the nonmagnetic layer 69 are selectively etched to expose the second portion of the top surface 12T of the main pole 12 and the second gap layer 19 is selectively etched to expose the top surface of the second connection layer, by performing IBE, for example. Next, the third magnetic film 16R including the fourth portion 16D of the trailing shield 16 is formed in the same manner as in the step of FIG. 12A and FIG. 12B described in relation to the first embodiment. The subsequent steps are the same as those in the first embodiment.

The remainder of configuration, function and effects of the present embodiment are similar to those of the first embodiment.

Third Embodiment

Figure 19:
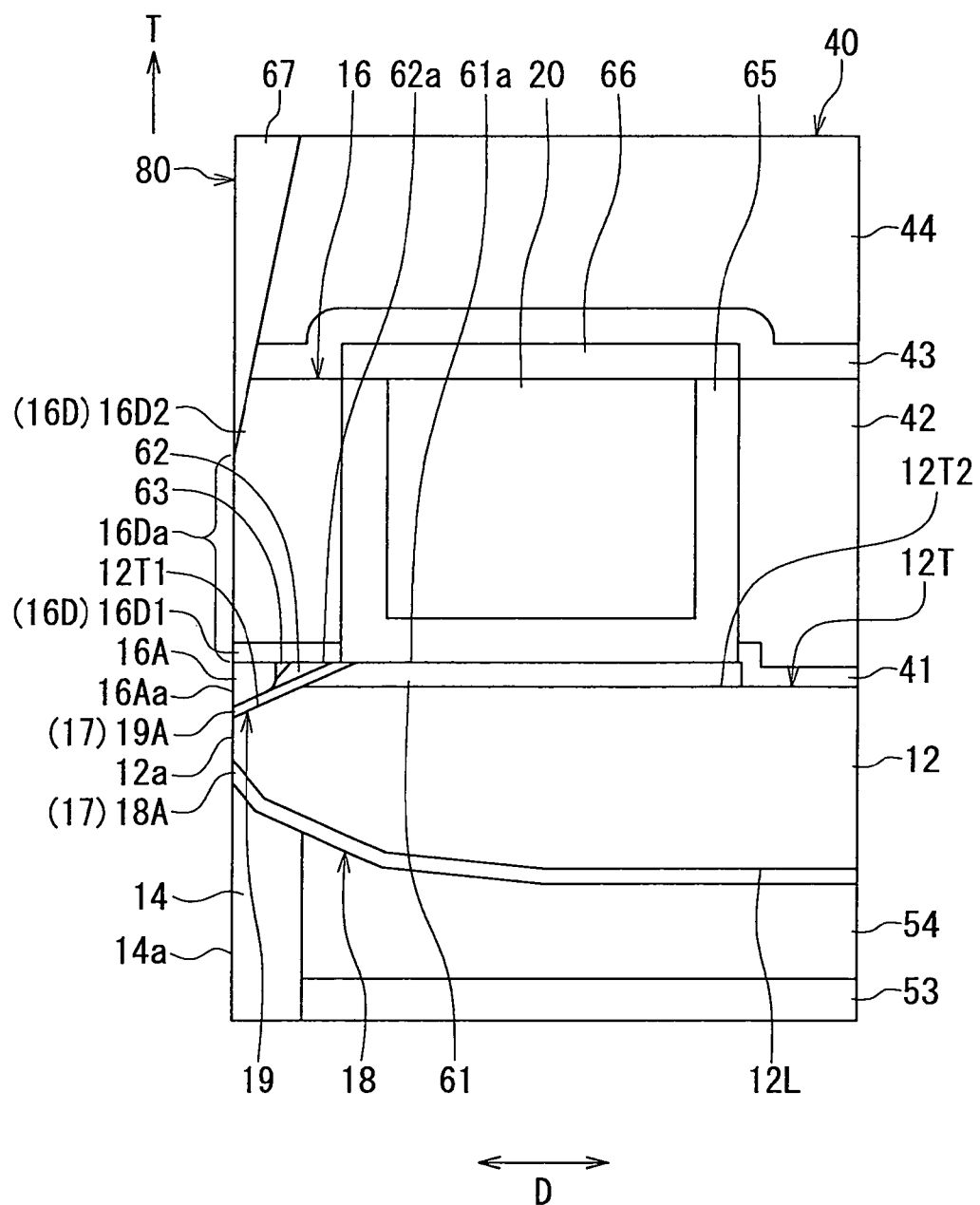
FIG. 19 is a cross-sectional view showing the main part of a magnetic head according to a third embodiment of the invention.

A magnetic head according to a third embodiment of the invention will now be described with reference to FIG. 19. FIG. 19 is a cross-sectional view showing the main part of the magnetic head according to the present embodiment. FIG. 19 shows a cross section perpendicular to the medium facing surface and to the top surface of the substrate, particularly the main cross section. The arrow labeled T in FIG. 19 indicates the direction of travel of the recording medium.

The magnetic head according to the present embodiment differs from the magnetic head according to the first embodiment in the following ways. In the present embodiment, the fifth portion 16E of the trailing shield 16 and the intermediate film 64 are omitted. The magnetic layer 16D2 of the fourth portion 16D of the trailing shield 16 is only provided on the seed layer 16D1 of the fourth portion 16D of the trailing shield 16. The present embodiment cannot provide the effects resulting from the provision of the fifth portion 16E and the intermediate film 64.

Figure 20:
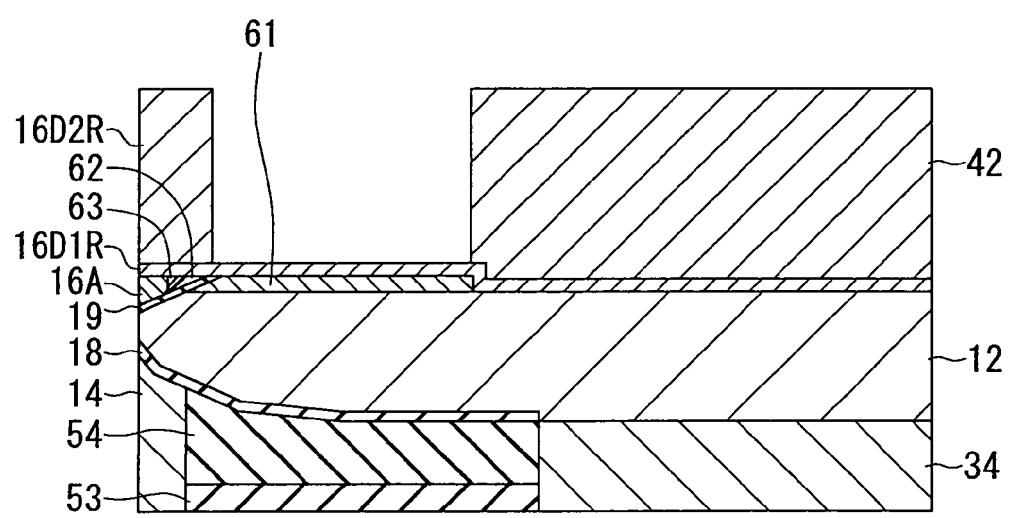
FIG. 20 is a cross-sectional view showing a step of a manufacturing method for the magnetic head according to the third embodiment of the invention.

A manufacturing method for the magnetic head according to the present embodiment will now be described with reference to FIG. 20. FIG. 20 illustrates a stack of layers formed in the process of manufacturing the magnetic head. FIG. 20 shows a cross section perpendicular to the medium facing surface 80 and to the top surface 1a of the substrate 1, particularly the main cross section. FIG. 20 omits the illustration of parts located below the leading shield 14, the magnetic layer 34 and the insulating layer 53.

The manufacturing method for the magnetic head according to the present embodiment is the same as the method according to the first embodiment up to the step shown in FIG. 11A and FIG. 11B. FIG. 20 shows the next step. In this step, first, the second gap layer 19 and the first nonmagnetic layer 61 are selectively etched in the same manner as in the step shown in FIG. 12A and FIG. 12B described in relation to the first embodiment. Next, the seed layer 16D1R is formed on the first and second magnetic films 16P and 16Q. Then, the magnetic layer 16D2R including the magnetic layer 16D2 of the fourth portion 16D, and the magnetic layer 42 are formed on the seed layer 16D1R by plating, using the seed layer 16D1R as a seed and a cathode. A part of the seed layer 16D1R that is not covered with the magnetic layers 16D2R and 42 is then removed. This makes the seed layer 16D1R into the seed layer 16D1 and the seed layer 41. Then, the insulating film 65 is formed in the same manner as in the step of FIG. 15A and FIG. 15B described in relation to the first embodiment. The subsequent steps are the same as those in the first embodiment.

The magnetic head according to the present embodiment may include the nonmagnetic layer 69 as in the second embodiment. The remainder of configuration, function and effects of the present embodiment are similar to those of the first or second embodiment.

Fourth Embodiment

Figure 21:
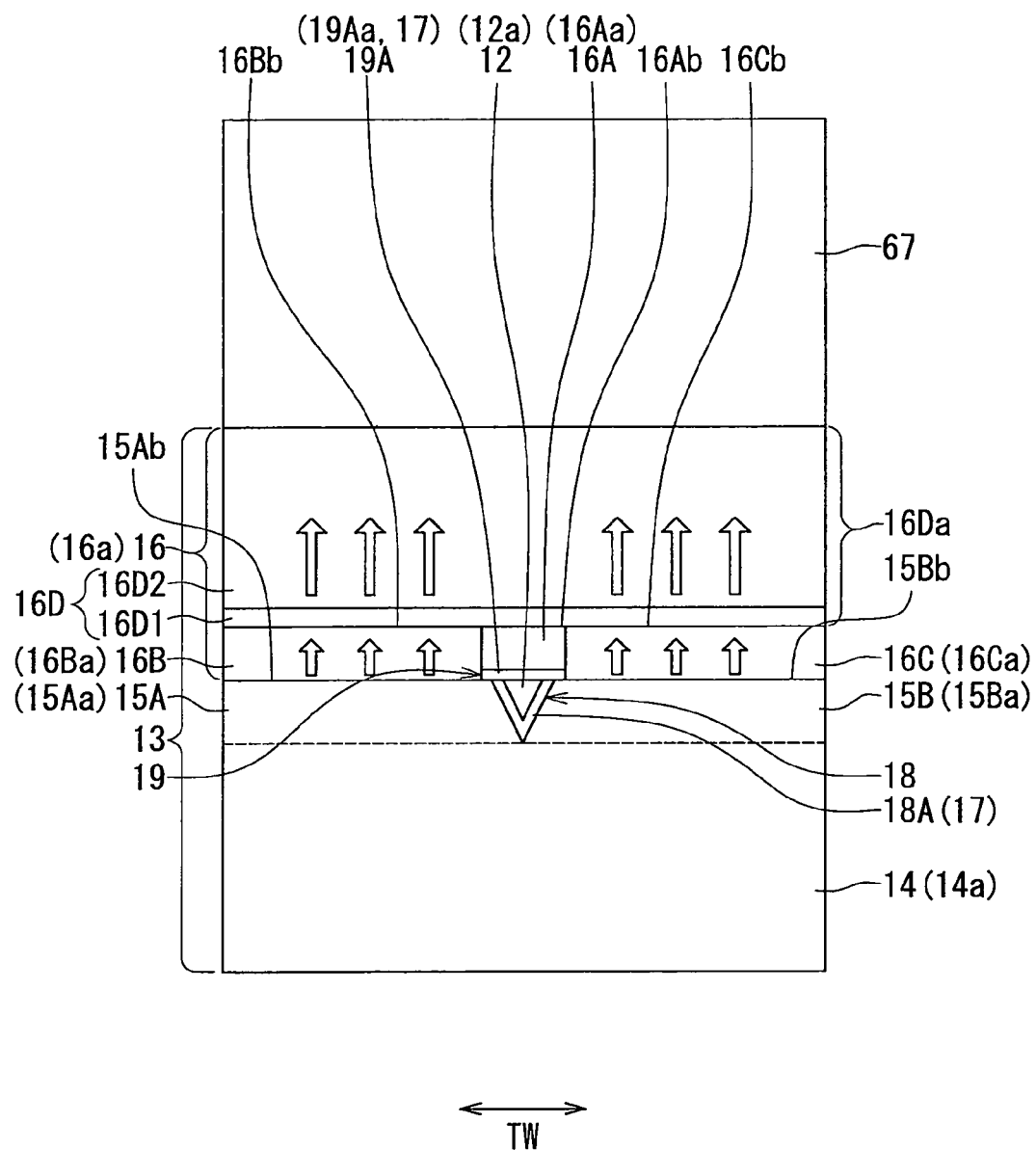
FIG. 21 is a front view showing the main part of a magnetic head according to a fourth embodiment of the invention.
Figure 22:
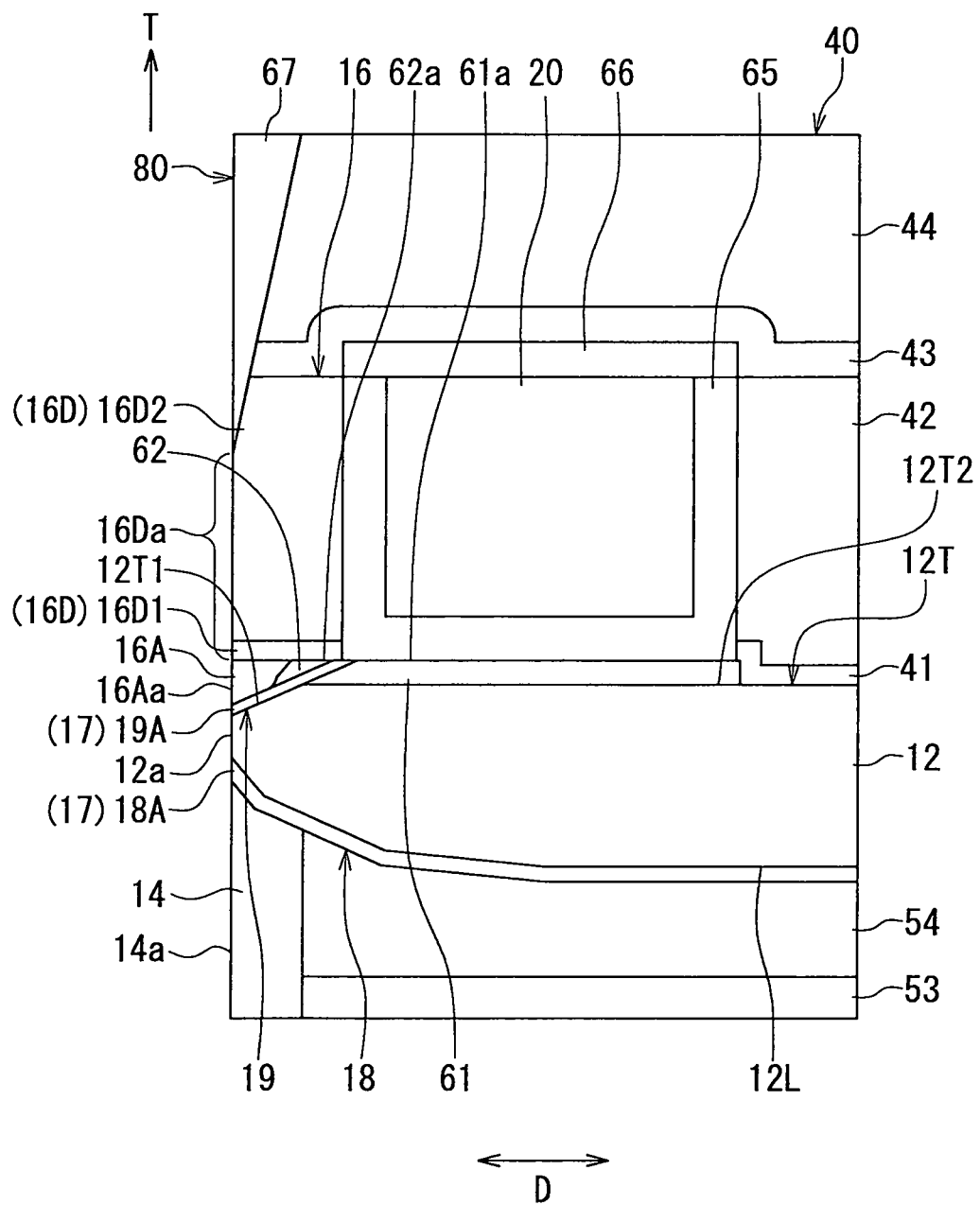
FIG. 22 is a cross-sectional view showing the main part of the magnetic head according to the fourth embodiment of the invention.

A magnetic head according to a fourth embodiment of the invention will now be described with reference to FIG. 21 and FIG. 22. FIG. 21 is a front view showing the main part of the magnetic head according to the present embodiment. The arrow labeled TW in FIG. 21 indicates the track width direction. FIG. 22 is a cross-sectional view showing the main part of the magnetic head according to the present embodiment. FIG. 22 shows a cross section perpendicular to the medium facing surface and to the top surface of the substrate, particularly the main cross section. The arrow labeled T in FIG. 22 indicates the direction of travel of the recording medium. The arrow labeled D in FIG. 22 indicates the direction perpendicular to the medium facing surface 80.

The magnetic head according to the present embodiment differs from the magnetic head according to the third embodiment in the following ways. In the present embodiment, the trailing gap section 19A of the gap section 17 has an end face 19Aa located in the medium facing surface 80. As has been described in relation to the first embodiment, the first portion 16A of the trailing shield 16 has the first end face 16Aa. The medium facing surface 80 includes the boundary between the end face 19Aa of the trailing gap section 19A and the end face 16Aa. At the boundary, as shown in FIG. 21, locations of opposite ends of the first end face 16Aa in the track width direction TW coincide with locations of opposite ends of the end face 19Aa of the trailing gap section 19A in the track width direction TW.

In the present embodiment, as shown in FIG. 22, part of the first portion 16A rides over the second nonmagnetic layer 62. Although not illustrated, the third nonmagnetic layer 63 is disposed around the first to third portions 16A, 16B and 16C of the trailing shield 16 and the second nonmagnetic layer 62 as in the third embodiment.

Figure 23A:
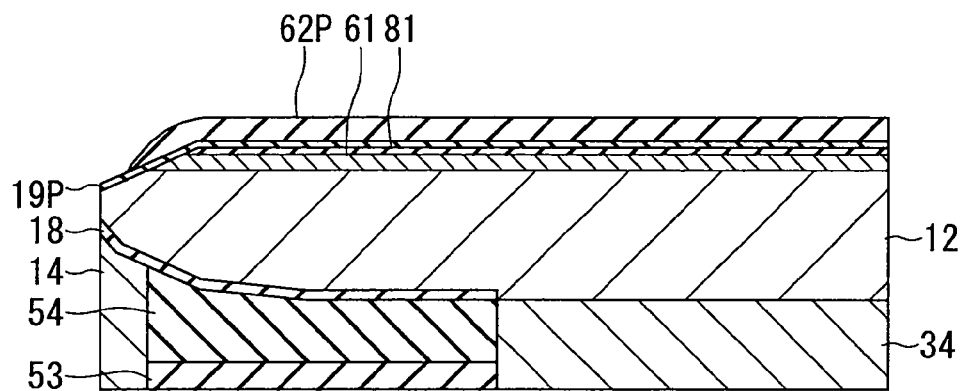
FIG. 23A and FIG. 23B are cross-sectional views showing a step of a manufacturing method for the magnetic head according to the fourth embodiment of the invention.
Figure 23B:
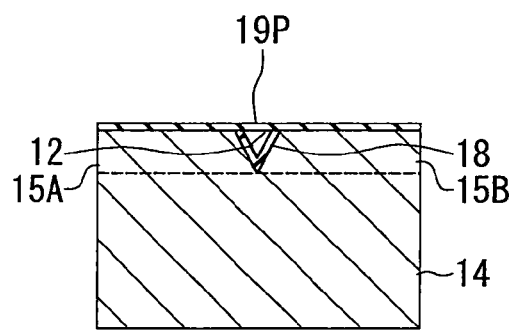

A manufacturing method for the magnetic head according to the present embodiment will now be described with reference to FIG. 23A to FIG. 28B. FIG. 24A to FIG. 28B each illustrate a stack of layers formed in the process of manufacturing the magnetic head. FIG. 23A and FIG. 28A each show a cross section perpendicular to the medium facing surface 80 and to the top surface 1a of the substrate 1, particularly the main cross section. FIG. 23B, FIG. 24A, FIG. 25 to FIG. 27, and FIG. 28B each show a cross section taken at the location at which the medium facing surface 80 is to be formed. These figures omit the illustration of parts located below the leading shield 14, the magnetic layer 34 and the insulating layer 53. FIG. 24B shows the top surface of the stack. In FIG. 24B, the symbol "ABS" indicates the location at which the medium facing surface 80 is to be formed.

The manufacturing method for the magnetic head according to the present embodiment is the same as the method according to the first embodiment up to the step of forming the main pole 12 of the first embodiment (see FIG. 7A to FIG. 7C). FIG. 23A and FIG. 23B show the next step. In this step, first, a nonmagnetic film 19P including the trailing gap section 19A is formed on the top surface of the stack by sputtering or chemical vapor deposition, for example. The nonmagnetic film 19P is formed to cover the first and second side shields 15A and 15B and the main pole 12 and not to cover at least part of the portion to be removed 15C described in relation to the first embodiment. Next, the initial nonmagnetic layer 62P is formed on the nonmagnetic film 19P to cover the first nonmagnetic layer 61. The formation method for the initial nonmagnetic layer 62P is the same as in the first embodiment.

Figure 24A:
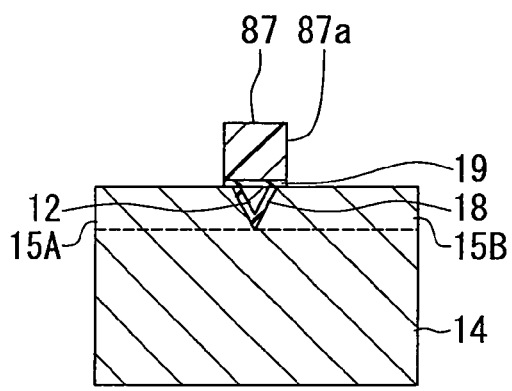
FIG. 24A and FIG. 24B are explanatory diagrams showing a step that follows the step shown in FIG. 23A and FIG. 23B.
Figure 24B:
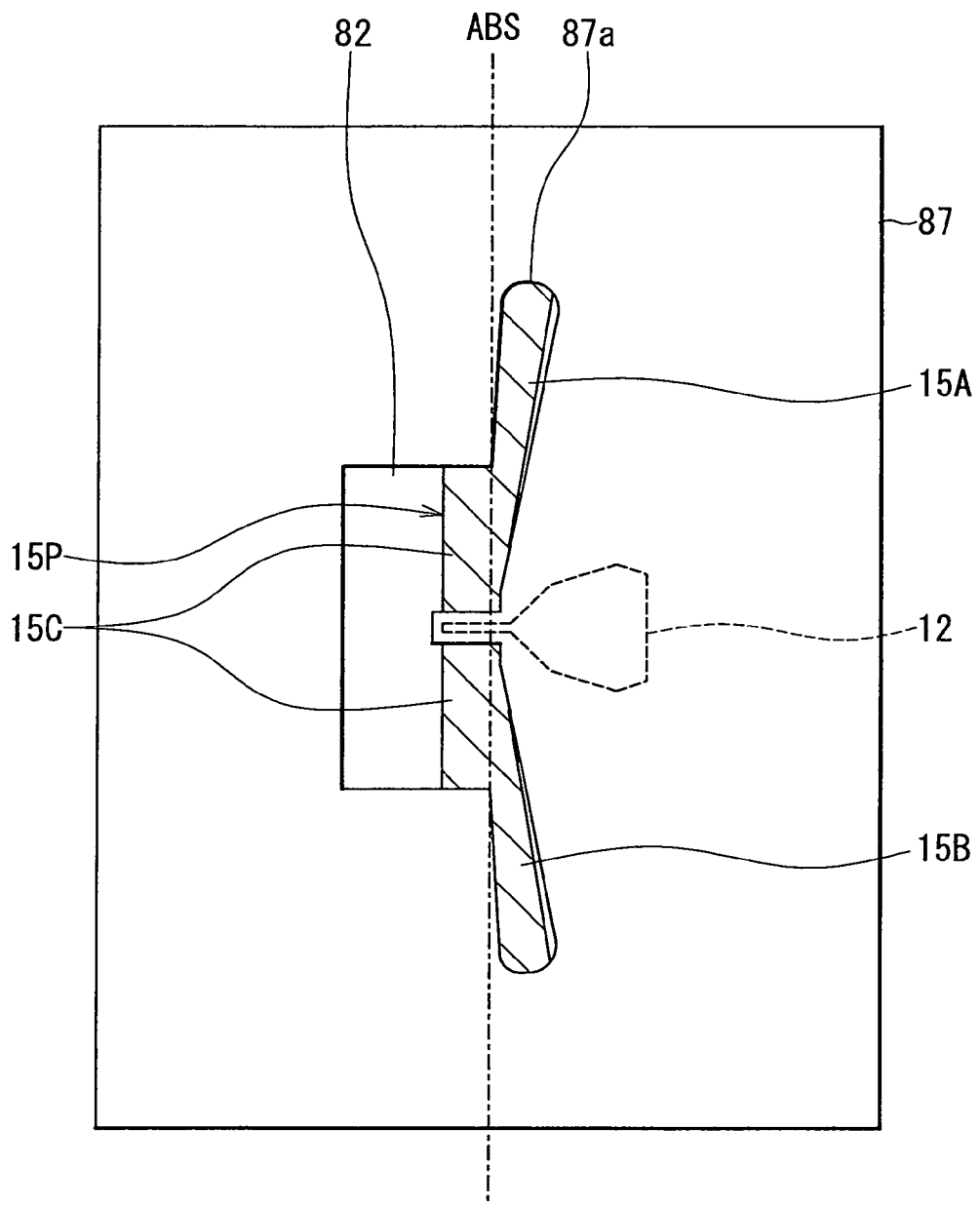

FIG. 24A and FIG. 24B show the next step. In this step, first, a seed layer 82 is formed over the magnetic layer 15P and the nonmagnetic film 19P by, for example, a lift-off process so as to be electrically connected to at least the portion to be removed 15C of the magnetic layer 15P having undergone the formation of the receiving section described in relation to the first embodiment. The seed layer 82 covers neither of a part of the top surface of the magnetic layer 15P near the main pole 12 and a part of the top surface of the magnetic layer 15P near the location ABS at which the medium facing surface 80 is to be formed. Next, a mask 87 is formed on the nonmagnetic film 19P. The mask 87 is formed by patterning a photoresist layer. The mask 87 has an opening 87a shaped to correspond to the planar shape (the shape as viewed from above) of the second and third portions 16B and 16C of the trailing shield 16 to be formed later. Then, part of the nonmagnetic film 19P is etched by, for example, RIE, IBE or wet etching using the mask 87 so that the trailing gap section 19A is formed. This step will hereinafter be referred to as the etching step. In the etching step, the nonmagnetic film 19P is etched to expose a part of each of the top surfaces 15Ab and 15Bb of the first and second side shields 15A and 15B. As a result of this etching step, the nonmagnetic film 19P becomes the second gap layer 19.

Figure 25:
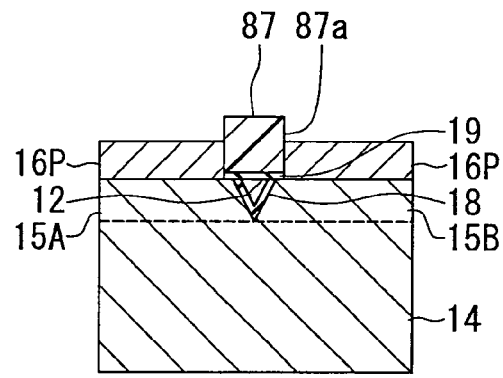
FIG. 25 is a cross-sectional view showing a step that follows the step shown in FIG. 24A and FIG. 24B.
Figure 26:
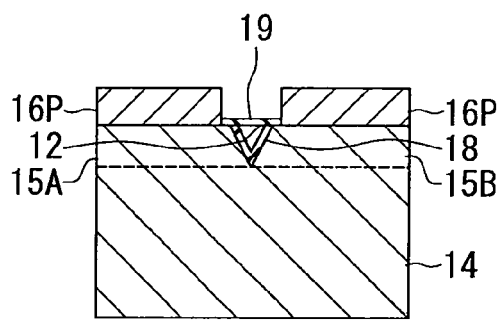
FIG. 26 is a cross-sectional view showing a step that follows the step shown in FIG. 25.

FIG. 25 shows the next step. In this step, in the presence of the mask 87, a first nonmagnetic film 16P including the second portion 16B and the third portion 16C of the trailing shield 16 is formed over the first and second side shields 15A and 15B by plating, using the first side shield 15A, the second side shield 15B and the seed layer 82 as a seed and a cathode. The first magnetic film 16P is formed such that its top surface is higher in level than the second and third top surfaces 16Bb and 16Cb of the second and third portions 16B and 16C to be formed later. Then, the mask 87 is removed as shown in FIG. 26.

Figure 27:
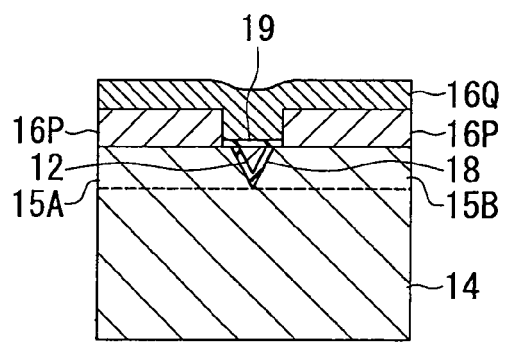
FIG. 27 is a cross-sectional view showing a step that follows the step shown in FIG. 26.
Figure 28A:
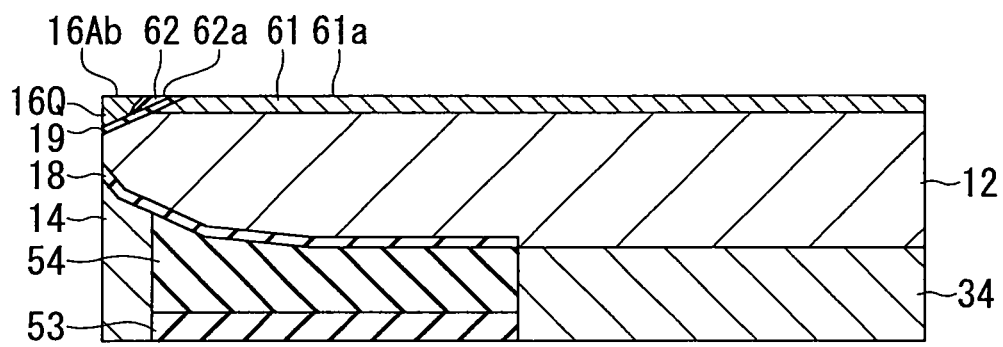
FIG. 28A and FIG. 28B are cross-sectional views showing a step that follows the step shown in FIG. 27.

FIG. 27 shows the next step. In this step, a second magnetic film 16Q including the first portion 16A of the trailing shield 16 is formed on the top surface of the stack by sputtering or ion beam deposition, for example.

Figure 28B:
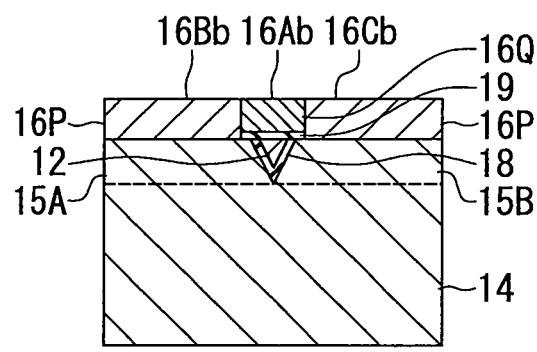

FIG. 28A and FIG. 28B show the next step. In this step, first, although not illustrated, the third nonmagnetic layer 63 is formed over the entire top surface of the stack. Then, the first magnetic film 16P, the second magnetic film 16Q, the second gap layer 19, the initial nonmagnetic layer 62P, the third nonmagnetic layer 63 and the insulating layer 81 are polished by CMP, for example. This step will hereinafter be referred to as the polishing step. In the polishing step, the first and second magnetic films 16P and 16Q are polished so as to form the first to third top surfaces 16Ab, 16Bb and 16Cb of the first to third portions 16A, 16B and 16C. In the polishing step, the first nonmagnetic layer 61 is used as a polishing stopper in polishing the first and second magnetic films 16P and 16Q. In the polishing step, the initial nonmagnetic layer 62P is polished together with the first and second magnetic films 16P and 16Q so that the initial nonmagnetic layer 62P becomes the second nonmagnetic layer 62. In the present embodiment, the polishing step defines the length of the first portion 16A in the direction D perpendicular to the medium facing surface 80. The subsequent steps are the same as those in the third embodiment.

The present embodiment allows the first to third portions 16A, 16B and 16C to be formed in a self-aligned manner. More specifically, in the present embodiment, the alignment of the trailing gap section 19A by the mask 87 brings the first to third portions 16A, 16B and 16C into alignment automatically. Particularly, the first portion 16A can be formed in a self-aligned manner such that the locations of opposite ends of the first end face 16Aa of the first portion 16A in the track width direction TW coincide with the locations of opposite ends of the end face 19Aa of the trailing gap section 19A in the track width direction TW, as mentioned previously.

The magnetic head according to the present embodiment excluding the first portion 16A of the trailing shield 16 and the trailing gap section 19A of the gap section 17 may be configured in the same manner as the first or second embodiment. The remainder of configuration, function and effects of the present embodiment are similar to those of any of the first to third embodiments.

The present invention is not limited to the foregoing embodiments, and various modifications may be made thereto. For example, as far as the requirements of the appended claims are met, the configurations, shapes and locations of the trailing shield 16, the first side shield 15A, the second side shield 15B and the leading shield 14, and magnetic materials to form them may be freely chosen, and need not necessarily be as in the respective examples illustrated in the foregoing embodiments.

In the foregoing embodiments, the second magnetic film 16Q is formed after the formation of the first magnetic film 16P. Alternatively, in the present invention, the first magnetic film 16P may be formed after the formation of the second magnetic film 16Q. In this case, the second magnetic film 16Q is formed on the initial nonmagnetic layer 62P and a nonmagnetic film including the trailing gap section 19A. In the step of forming the second magnetic film 16Q, the second magnetic film 16Q and an etching mask may be formed in this order and then a part of the second magnetic film 16Q may be selectively etched by, for example, IBE using the etching mask so as to form the first portion 16A. In the case of etching the second magnetic film 16Q by IBE, the etching of the second magnetic film 16Q may be followed by etching of the nonmagnetic film to form the trailing gap section 19A. In the case of etching the nonmagnetic film by IBE, the first and second side shields 15A and 15B may also be etched in part. Alternatively, after the etching of the second magnetic film 16Q, the nonmagnetic film may be etched by wet etching to form the trailing gap section 19A. The first magnetic film 16P is formed to cover the first portion 16A after the formation of the trailing gap section 19A. Thereafter, the step of polishing the first and second magnetic films 16P and 16Q is performed so that the first to third top surfaces 16Ab, 16Bb and 16Cb of the first to third portions 16A, 16B and 16C are formed.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A magnetic head for perpendicular magnetic recording, comprising:
    a medium facing surface configured to face a recording medium;
    a coil for producing a magnetic field corresponding to data to be written on the recording medium;
    a main pole having an end face located in the medium facing surface, the main pole being configured to pass a magnetic flux corresponding to the magnetic field produced by the coil, and to produce a write magnetic field for use to write the data on the recording medium by means of a perpendicular magnetic recording system;
    a write shield; and
    a gap section formed of a nonmagnetic material and located between the main pole and the write shield, wherein
    the write shield includes a trailing shield located on a front side in a direction of travel of the recording medium relative to the main pole,
    the trailing shield includes a first portion, a second portion, a third portion and a fourth portion each of which is formed of a magnetic material,
    the first portion has a first end face located in the medium facing surface, and a first top surface located at a front-side end of the first portion in the direction of travel of the recording medium, the first end face being on the front side in the direction of travel of the recording medium relative to the end face of the main pole,
    the second portion has a second end face located in the medium facing surface, and a second top surface located at a front-side end of the second portion in the direction of travel of the recording medium,
    the third portion has a third end face located in the medium facing surface, and a third top surface located at a front-side end of the third portion in the direction of travel of the recording medium,
    the second end face and the third end face are located on opposite sides of the first end face in a track width direction,
    the first to third top surfaces are coplanar with each other,
    the fourth portion lies on the first to third top surfaces and has a fourth end face located in the medium facing surface, and
    the first portion is higher in saturation flux density than the second to fourth portions.

2. The magnetic head for perpendicular magnetic recording according to claim 1, wherein the fourth portion includes a seed layer lying on the first to third top surfaces, and a magnetic layer lying on the seed layer.

3. The magnetic head for perpendicular magnetic recording according to claim 2, wherein
    the trailing shield further includes a fifth portion formed of a magnetic material, and an intermediate film interposed between the magnetic layer and the fifth portion,
    the fifth portion is located farther from the medium facing surface than is the magnetic layer, and
    a thickness of the intermediate film in a direction perpendicular to the medium facing surface is smaller than a maximum thickness of the magnetic layer in the direction perpendicular to the medium facing surface.

4. The magnetic head for perpendicular magnetic recording according to claim 1, wherein
    the write shield further includes a first side shield and a second side shield located on opposite sides of the main pole in the track width direction,
    the gap section includes a side gap section for separating the first and second side shields from the main pole, and a trailing gap section for separating the trailing shield from the main pole, the first side shield has a top surface located at a front-side end of the first side shield in the direction of travel of the recording medium, the second side shield has a top surface located at a front-side end of the second side shield in the direction of travel of the recording medium, the top surface of the first side shield and the top surface of the second side shield are coplanar with each other, the first portion of the trailing shield is located on the trailing gap section, the second portion of the trailing shield is located on the top surface of the first side shield, and the third portion of the trailing shield is located on the top surface of the second side shield.

5. The magnetic head for perpendicular magnetic recording according to claim 4, wherein the write shield further includes a leading shield located on a rear side in the direction of travel of the recording medium relative to the main pole.

6. The magnetic head for perpendicular magnetic recording according to claim 1, wherein the gap section includes a trailing gap section for separating the trailing shield from the main pole, the trailing gap section has an end face located in the medium facing surface, the medium facing surface includes a boundary between the end face of the trailing gap section and the first end face, and at the boundary, locations of opposite ends of the first end face in the track width direction coincide with locations of opposite ends of the end face of the trailing gap section in the track width direction.

7. The magnetic head for perpendicular magnetic recording according to claim 1, further comprising a first nonmagnetic layer formed of a nonmagnetic material and located on the front side in the direction of travel of the recording medium relative to the main pole, the first nonmagnetic layer being at a greater distance from the medium facing surface than is the first portion, wherein the first nonmagnetic layer has a top surface located at a front-side end of the first nonmagnetic layer in the direction of travel of the recording medium, and the top surface of the first nonmagnetic layer is coplanar with the first to third top surfaces.

8. The magnetic head for perpendicular magnetic recording according to claim 7, further comprising a second nonmagnetic layer formed of a nonmagnetic material and located on the front side in the direction of travel of the recording medium relative to the main pole, the second nonmagnetic layer being at a greater distance from the medium facing surface than is the first portion, wherein at least part of the second nonmagnetic layer is located between the first portion and the first nonmagnetic layer, the second nonmagnetic layer has a top surface located at a front-side end of the second nonmagnetic layer in the direction of travel of the recording medium, and the top surface of the second nonmagnetic layer is coplanar with the first to third top surfaces and the top surface of the first nonmagnetic layer.

9. A manufacturing method for the magnetic head for perpendicular magnetic recording of claim 1, comprising the steps of:

forming the coil;

forming the main pole;

forming the write shield; and forming the gap section, wherein the step of forming the write shield includes the step of forming the trailing shield, and the step of forming the trailing shield includes the steps of:

forming a first magnetic film and a second magnetic film, the first magnetic film including the second portion and the third portion, the second magnetic film including the first portion;

polishing the first and second magnetic films so that the first to third top surfaces are formed; and forming a third magnetic film on the first and second magnetic films polished, the third magnetic film including the fourth portion.

10. The manufacturing method for the magnetic head for perpendicular magnetic recording according to claim 9, wherein the step of forming the first magnetic film and the second magnetic film forms the second magnetic film after forming the first magnetic film.

11. The manufacturing method for the magnetic head for perpendicular magnetic recording according to claim 9, wherein the step of forming the third magnetic film includes the steps of: forming a seed layer on the first and second magnetic films; and forming a magnetic layer on the seed layer by plating using the seed layer as a seed and a cathode.

12. The manufacturing method for the magnetic head for perpendicular magnetic recording according to claim 11, wherein the trailing shield further includes a fifth portion formed of a magnetic material, and an intermediate film interposed between the magnetic layer and the fifth portion, the fifth portion is located farther from the medium facing surface than is the magnetic layer, a thickness of the intermediate film in a direction perpendicular to the medium facing surface is smaller than a maximum thickness of the magnetic layer in the direction perpendicular to the medium facing surface, and the step of forming the trailing shield further includes the steps of: forming the intermediate film after the step of forming the magnetic layer; and forming the fifth portion after the step of forming the intermediate film.

13. The manufacturing method for the magnetic head for perpendicular magnetic recording according to claim 9, wherein the write shield further includes a first side shield and a second side shield located on opposite sides of the main pole in the track width direction, the gap section includes a side gap section for separating the first and second side shields from the main pole, and a trailing gap section for separating the trailing shield from the main pole, the first side shield has a top surface located at a front-side end of the first side shield in the direction of travel of the recording medium, the second side shield has a top surface located at a front-side end of the second side shield in the direction of travel of the recording medium, the top surface of the first side shield and the top surface of the second side shield are coplanar with each other, the first portion of the trailing shield is located on the trailing gap section, the second portion of the trailing shield is located on the top surface of the first side shield, the third portion of the trailing shield is located on the top surface of the second side shield, the step of forming the write shield further includes the step of forming the first and second side shields before the step of forming the trailing shield, and the step of forming the gap section includes the step of forming the trailing gap section after the step of forming the first and second side shields and the step of forming the main pole and before the step of forming the trailing shield.

14. The manufacturing method for the magnetic head for perpendicular magnetic recording according to claim 13, wherein the step of forming the first magnetic film and the second magnetic film forms the first magnetic film by plating using the first and second side shields as a seed and a cathode, and then forms the second magnetic film.

15. The manufacturing method for the magnetic head for perpendicular magnetic recording according to claim 9, wherein the gap section includes a trailing gap section for separating the trailing shield from the main pole, the trailing gap section has an end face located in the medium facing surface, the medium facing surface includes a boundary between the end face of the trailing gap section and the first end face, at the boundary, locations of opposite ends of the first end face in the track width direction coincide with locations of opposite ends of the end face of the trailing gap section in the track width direction, the step of forming the gap section includes the step of forming the trailing gap section, the step of forming the trailing gap section includes the steps of:
  forming a nonmagnetic film including the trailing gap section;
  forming a mask on the nonmagnetic film; and
  etching a part of the nonmagnetic film using the mask so that the trailing gap section is formed, and the step of forming the first magnetic film and the second magnetic film forms the first magnetic film in the presence of the mask, then removes the mask, and then forms the second magnetic film.

16. The manufacturing method for the magnetic head for perpendicular magnetic recording according to claim 9, wherein the magnetic head further comprises a first nonmagnetic layer formed of a nonmagnetic material and located on the front side in the direction of travel of the recording medium relative to the main pole, the first nonmagnetic layer being at a greater distance from the medium facing surface than is the first portion, the first nonmagnetic layer has a top surface located at a front-side end of the first nonmagnetic layer in the direction of travel of the recording medium, the top surface of the first nonmagnetic layer is coplanar with the first to third top surfaces, the manufacturing method for the magnetic head further comprises the step of forming the first nonmagnetic layer before the first and second magnetic films are formed, the step of polishing the first and second magnetic films polishes the first and second magnetic films using the first nonmagnetic layer as a polishing stopper, and the step of polishing the first and second magnetic films defines a length of the first portion in a direction perpendicular to the medium facing surface.

17. The manufacturing method for the magnetic head for perpendicular magnetic recording according to claim 16, wherein the magnetic head further comprises a second nonmagnetic layer formed of a nonmagnetic material and located on the front side in the direction of travel of the recording medium relative to the main pole, the second nonmagnetic layer being at a greater distance from the medium facing surface than is the first portion, at least part of the second nonmagnetic layer is located between the first portion and the first nonmagnetic layer, the second nonmagnetic layer has a top surface located at a front-side end of the second nonmagnetic layer in the direction of travel of the recording medium, the top surface of the second nonmagnetic layer is coplanar with the first to third top surfaces and the top surface of the first nonmagnetic layer, the manufacturing method for the magnetic head further comprises the step of forming an initial nonmagnetic layer to cover the first nonmagnetic layer after the first nonmagnetic layer is formed and before the first and second magnetic films are formed, and the step of polishing the first and second magnetic films polishes the initial nonmagnetic layer together with the first and second magnetic films so that the initial nonmagnetic layer becomes the second nonmagnetic layer.

\* \* \* \* \*